United States Patent
Saadeh et al.

(10) Patent No.: US 12,316,809 B2
(45) Date of Patent: May 27, 2025

(54) METHOD TO ACCESS OR MANAGE AN OPERATOR'S VOICEMAIL SYSTEM FROM A DIGITAL ASSIST OR SMART DEVICE

(71) Applicant: Telefonaktiebolaget LM Ericsson (publ), Stockholm (SE)

(72) Inventors: Anthony Saadeh, Saint-Laurent (CA); Mario Georgakis, Montreal (CA); Lan Tran, Montreal (CA); Cheng Jun Li, Pierrefonds (CA); Kien Minh Huy Banh, Montreal (CA); Elie Wanna, Montreal (CA); Antoine Daou, Chandler (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 417 days.

(21) Appl. No.: 17/789,654

(22) PCT Filed: Jan. 7, 2021

(86) PCT No.: PCT/IB2021/050104
§ 371 (c)(1),
(2) Date: Jun. 28, 2022

(87) PCT Pub. No.: WO2021/140470
PCT Pub. Date: Jul. 15, 2021

(65) Prior Publication Data
US 2023/0035278 A1 Feb. 2, 2023

Related U.S. Application Data

(60) Provisional application No. 62/958,168, filed on Jan. 7, 2020.

(51) Int. Cl.
*H04M 3/533* (2006.01)
*H04M 3/527* (2006.01)

(52) U.S. Cl.
CPC ....... *H04M 3/53333* (2013.01); *H04M 3/527* (2013.01); *H04M 2203/1008* (2013.01)

(58) Field of Classification Search
CPC ..... H04M 3/53; H04M 3/53333; H04M 3/527
See application file for complete search history.

(56) References Cited

U.S. PATENT DOCUMENTS

| 8,260,260 B1 * | 9/2012 | Brown ................ H04W 12/08 713/168 |
| 10,403,283 B1 | 9/2019 | Schramm et al. |
| 2010/0151831 A1 | 6/2010 | Hao et al. |

FOREIGN PATENT DOCUMENTS

| EP | 1879371 A1 * | 1/2008 | ............ G06Q 40/04 |
| WO | WO-2011115829 A1 * | 9/2011 | ........... G06F 1/1626 |

OTHER PUBLICATIONS

International Search Report and Written Opinion dated Feb. 24, 2021 for International Application No. PCT/IB2021/050104 filed Jan. 7, 2021, consisting of 10 pages.

* cited by examiner

*Primary Examiner* — Kevin Kim
(74) *Attorney, Agent, or Firm* — Weisberg I.P. Law, P.A.

(57) ABSTRACT

A method, system and apparatus are disclosed. According to some embodiments, an assistant network node configured to communicate with a proxy network node is provided. The assistant network node includes processing circuitry configured to receive, over an internet, a request message associated with a digital assistant device where the request message inquires about a voicemail function of a voicemail system related to a user of a fixed or cellular network, access the voicemail system based at least in part on the request message where the accessing of the voicemail system is performed without establishing a voice channel in the fixed or cellular network, and return a response message to the (Continued)

digital assistant device over the internet based at least in part on the access of the voicemail system in the fixed or cellular network.

20 Claims, 16 Drawing Sheets

10:10pm

<Operator logo>

1) 514-345-XXXX   Oct 1 2019, 4:30pm, NEW
2) 514-820-XXXX   Oct 1 2019, 5:15pm, NEW
3) 514-402-XXXX   Aug 5 2019, 9:00am, SAVED

<Operator promo> "Unlimited data plans from 23Euro on our brand new 5G network"

FIG. 16

METHOD TO ACCESS OR MANAGE AN OPERATOR'S VOICEMAIL SYSTEM FROM A DIGITAL ASSIST OR SMART DEVICE

CROSS-REFERENCE TO RELATED APPLICATIONS

This application is a Submission Under 35 U.S.C. § 371 for U.S. National Stage Patent Application of International Application No.: PCT/IB2021/050104, filed Jan. 7, 2021 entitled "METHOD TO ACCESS OR MANAGE AN OPERATOR'S VOICEMAIL SYSTEM FROM A DIGITAL ASSIST OR SMART DEVICE," which claims priority to U.S. Provisional Application No. 62/958,168, filed Jan. 7, 2020, entitled "METHOD TO ACCESS OR MANAGE AN OPERATOR'S VOICEMAIL SYSTEM FROM A DIGITAL ASSIST OR SMART DEVICE," the entireties of both of which are incorporated herein by reference.

TECHNICAL FIELD

The present disclosure relates to wireless communications, and in particular, to accessing voicemail functions of a voicemail system.

BACKGROUND

Digital assistant devices continue to gain in popularity where these digital assistants are able to, for example, receive voice commands from a user for execution. In some existing systems, a mobile or home telephony subscriber ("subscriber") can use digital assistants to access their voicemail by dialing, via the digital assistant device, to the voicemail system and entering the subscriber's phone number and PIN by speaking to the digital assistant device. However, this method of accessing the voicemail by dialing-in to the voice mail system poses one or more of the following problems:

- The user experience is poor. The subscriber may have to continuously say, to the digital assistant device, press 1, press 3, press 4, etc., to enter their mailbox phone number and subsequent PIN number in the voicemail system.
- Navigating the menus in the voicemail system may be difficult since the telephony user interface (TUI) menus were designed for touchtone phones and not for digital assistant devices.
- Recording a message or greeting in the voicemail system may be difficult to perform since the end of a message may contain extra recording instructions given to the digital assistant device which may include the spoken trigger word.
- Security issues: The operator (e.g., voicemail operator) may have to allow the smart speaker (i.e., type of digital assistant device) to dial into the voicemail system (as would a mobile or home phone) and due to this, a subscriber can lock out other users/subscribers by entering the wrong mailbox phone number and PIN. Further, malicious attacks can occur on the voicemail system via the digital assistant devices.
- The Overall user experience in using a TUI limits the user/subscriber from accessing various functions such as from selecting specific messages to listen to and other barriers related to TUI navigation.

SUMMARY

Some embodiments advantageously provide methods, systems, and apparatuses for accessing voicemail functions (e.g., accessing voicemail message, changing voicemail configuration, etc.) of a voicemail system without relying on and/or using a voice channel such that the disclosure provides internet-based access to voicemail functions without having to establish a voice channel within a cellular network (Public Land Mobil Network (PLMN)) and/or without having to establish a voice channel within a fixed network (PSTN) or in any other network type that involves dedicated voice channels to support voice communications. In one or more embodiments, the network type includes IP Multimedia Subsystem (IMS), Voice over IP (VoIP), satellite communications, etc. As used herein, a voice channel may refer to a communication channel that carries voice signals as part of a voice communication session or live voice session. The voice channel may be provided by a cellular network and/or a fixed network.

One or more embodiments described herein break away from the typically calling of the voicemail system by, for example, moving to a voice user interface design with secured and seamless access to help make the experience conversational. The access to the voicemail system may be performed over the internet using data and may not require setting up or establishing a phone call.

One or more embodiments may include and/or use one or more of the following:

- A call flow proxy (i.e., assistant network node) that is configured to handle the sessions and act on the user intentions such as, for example: listening to, skipping to, depositing, deleting, selecting a, viewing video/audio message and general voicemailbox administration.
- A proxy (i.e., access proxy network node) that may be installed with the voicemail system to allow for retrieval, listing, depositing, deleting, uploading, viewing video/audio messages and general voicemail box administration.

One or more embodiments described herein may have one or more advantages over the traditional method of calling (i.e., setting up or establishing a voice call) a voicemail system:

- The user interaction with the digital assistant device is seamless and conversational and introduces increased convenience.
- The user interaction with the digital assistant device may not require the typical menu driven access found in TUI that may require pressing a number for a menu item. Access to a menu may be more efficient because the user/subscriber can immediately request what they want to do (e.g., what action the subscriber wants to perform with respect to the voicemail system) without being prompted or navigating multiple menus.
- Secure access to the voicemailbox in the voicemail system without having to enter a PIN number and/or password such as during the requests for voicemail and/or the retrieval of voicemail
- May use data only over an internet access for accessing the voicemail system such that no voice channels/voice communications may be required for such access.

According to one aspect of the disclosure, an assistant network node configured to communicate with a proxy network node is provided. The assistant network node includes processing circuitry configured to receive, over an internet, a request message associated with a digital assistant device where the request message inquires about a voicemail function of a voicemail system related to a user of a fixed or cellular network. The processing circuitry is further configured to access the voicemail system in the fixed or cellular network based at least in part on the request message where the accessing of the voicemail system is performed without establishing a voice channel in the fixed or cellular network, and return a response message to the digital assistant device over the internet based at least in part on the access of the voicemail system in the fixed or cellular network.

According to one or more embodiments of this aspect, the accessing of the voicemail system in the fixed or cellular network includes transmitting a first retrieval message to the proxy network node. The first retrieval message configured to cause the proxy network node to access a voicemail system to retrieve information associated with the digital assistant device and a voicemail function of the voicemail system in the fixed or cellular network, and at least one voicemail message associated with the information. The accessing of the voicemail system in the fixed or cellular network includes receiving a first reply message from the proxy network node including information associated with the voicemail function of the voicemail system in the fixed or cellular network and the at least one voicemail message. The response message to the digital assistant device includes the at least one voicemail message.

According to one or more embodiments of this aspect, the accessing of the voicemail system in the fixed or cellular network includes transmitting a first retrieval message to the proxy network node where the first retrieval message is configured to cause the proxy network node to access the voicemail system to retrieve information associated with the digital assistant device and a voicemail function of the voicemail system in the fixed or cellular network. The accessing of the voicemail system in the fixed or cellular network includes receiving a first reply message from the proxy network node indicating the information associated with the voicemail function of the voicemail system in the fixed or cellular network, and transmitting a second retrieval message associated with the digital assistant device to the proxy network node where the second retrieval message is based at least in part on the information associated with the voicemail function of the voicemail system in the fixed or cellular network and configured to cause retrieval of at least one voicemail message. The accessing of the voicemail system in the fixed or cellular network includes receiving the at least one voicemail message from the proxy network node based at least in part on the second retrieval message. The response message includes at least voicemail message destined for the digital assistant device.

According to one or more embodiments of this aspect, the messages are HTTP/S messages. According to one or more embodiments of this aspect, the processing circuitry is further configured to one or more of retrieve a pre-authentication indication for the digital assistant device and obtain authentication information to authenticate the digital assistant device. According to one or more embodiments of this aspect, the digital assistant device is a voice activated digital assistant device.

According to another aspect of the disclosure, a method implemented in an assistant network node that is configured to communicate with a proxy network node is provided. A request message associated with a digital assistant device is received over the internet where the request message inquires about a voicemail function of a voicemail system related to a user of a fixed or cellular network. The voicemail system in the fixed or cellular network is accessed based at least in part on the request message where the accessing of the voicemail system is performed without establishing a voice channel in the fixed or cellular network. A response message is returned to the digital assistant device over the internet based at least in part on the access of the voicemail system in the fixed or cellular network.

According to one or more embodiments of this aspect, the accessing of the voicemail system in the fixed or cellular network includes transmitting a first retrieval message to the proxy network node. The first retrieval message configured to cause the proxy network node to access a voicemail system to retrieve information associated with the digital assistant device and a voicemail function of the voicemail system in the fixed or cellular network, and at least one voicemail message associated with the information. The accessing of the voicemail system in the fixed or cellular network includes receiving a first reply message from the proxy network node including information associated with the voicemail function of the voicemail system in the fixed or cellular network and the at least one voicemail message. The response message to the digital assistant device includes the at least one voicemail message. According to one or more embodiments of this aspect, the accessing of the voicemail system in the fixed or cellular network includes transmitting a first retrieval message to the proxy network node where the first retrieval message is configured to cause the proxy network node to access the voicemail system to retrieve information associated with the digital assistant device and a voicemail function of the voicemail system in the fixed or cellular network. The accessing of the voicemail system in the fixed or cellular network includes receiving a first reply message from the proxy network node indicating the information associated with the voicemail function of the voicemail system in the fixed or cellular network. The accessing of the voicemail system in the fixed or cellular network includes transmitting a second retrieval message associated with the digital assistant device to the proxy network node where the second retrieval message is based at least in part on the information associated with the voicemail function of the voicemail system in the fixed or cellular network and configured to cause retrieval of at least one voicemail message. The accessing of the voicemail system in the fixed or cellular network includes receiving the at least one voicemail message from the proxy network node based at least in part on the second retrieval message. The response message includes at least voicemail message destined for the digital assistant device.

According to one or more embodiments of this aspect, the messages are HTTP/S messages. According to one or more embodiments of this aspect, one or more of retrieving a pre-authentication indication for the digital assistant device and obtaining authentication information to authenticate digital assistant device are performed. According to one or more embodiments of this aspect, the digital assistant device is a voice activated digital assistant device.

According to another aspect of the disclosure, a proxy network node configured to communicate with at least a voicemail system is provided. The proxy network node includes processing circuitry configured to access a voicemail system in a fixed or cellular network related to a user based at least in part on an inquiry about a voicemail function of the voicemail system from a digital assistant device where the accessing of the voicemail system is performed without establishing a voice channel in the fixed or cellular network. The processing circuitry is further configured to return a message destined for the digital assistant device based at least in part on the access of the voicemail system in the fixed or cellular network, the message being associated with the inquiry about the voicemail function of the voicemail system.

According to one or more embodiments of this aspect, the processing circuitry is further configured to receive a first retrieval message. The first retrieval message configured to cause the proxy network node to access a voicemail system to retrieve information associated with the digital assistant device and a voicemail function of the voicemail system in the fixed or cellular network and at least one voicemail message associated with the information. The processing circuitry is further configured to transmit a first reply message includes information associated with the voicemail function of the voicemail system in the fixed or cellular network and the at least one voicemail message. The message destined to the digital assistant device includes the at least one voicemail message. According to one or more embodiments of this aspect, the processing circuitry is further configured to receive a first retrieval message where the first retrieval message configured to cause the proxy network node to access the voicemail system to retrieve information associated with the digital assistant device and a voicemail function of the voicemail system in the fixed or cellular network. The processing circuitry is further configured to transmit a first reply message from the proxy network node indicating the information associated with the voicemail function of the voicemail system in the fixed or cellular network, and receive a second retrieval message associated with the digital assistant device from the proxy network node. The second retrieval message is based at least in part on the information associated with the voicemail function of the voicemail system in the fixed or cellular network and configured to cause retrieval of at least one voicemail message. The processing circuitry is further configured to transmit the at least one voicemail message based at least in part on the second retrieval message. The message destined for the digital assistant device includes the at least voicemail message.

According to one or more embodiments of this aspect, the information associated with the voicemail function is a list of URLs where each URL is associated with a respective voicemail message. The at least one voicemail message is destined for the digital assistant device being an encoded audio file. According to one or more embodiments of this aspect, the messages are HTTP/S messages. According to one or more embodiments of this aspect, the accessing of the voicemail system bypasses a telephony user interface of the voicemail system.

According to one or more embodiments of this aspect, the proxy network node is a trusted entity that is configured to perform voicemail box administration with the voicemail system for a subscriber associated with the digital assistant device. According to one or more embodiments of this aspect, the message destined for digital assistant device is based on retrieved audio data associated from the voicemail system that has been converted to audio data compatible with the digital assistant device. According to one or more embodiments of this aspect, the digital assistant device is a voice activated digital assistant device.

According to another aspect of the disclosure, a method implemented in a proxy network node that is configured to communicate with at least a voicemail system is provided. A voicemail system in a fixed or cellular network related to a user is accessed based at least in part on an inquiry about a voicemail function of the voicemail system from a digital assistant device where the accessing of the voicemail system is performed without establishing a voice channel in the fixed or cellular network. A message destined for the digital assistant device is returned based at least in part on the access of the voicemail system in the fixed or cellular network where the message is associated with the inquiry about the voicemail function of the voicemail system.

According to one or more embodiments of this aspect, a first retrieval message is received. The first retrieval message is configured to cause the proxy network node to access a voicemail system to retrieve information associated with the digital assistant device and a voicemail function of the voicemail system in the fixed or cellular network and at least one voicemail message associated with the information. A first reply message is transmitted where the first reply message includes information associated with the voicemail function of the voicemail system in the fixed or cellular network and the at least one voicemail message. The message destined to the digital assistant device includes the at least one voicemail message. According to one or more embodiments of this aspect, a first retrieval message is received where the first retrieval message is configured to cause the proxy network node to access the voicemail system to retrieve information associated with the digital assistant device and a voicemail function of the voicemail system in the fixed or cellular network. A first reply message is transmitted from the proxy network node indicating the information associated with the voicemail function of the voicemail system in the fixed or cellular network. A second retrieval message associated with the digital assistant device from the proxy network node is received where the second retrieval message is based at least in part on the information associated with the voicemail function of the voicemail system in the fixed or cellular network and configured to cause retrieval of at least one voicemail message. The at least one voicemail message is transmitted based at least in part on the second retrieval message. The message destined for the digital assistant device includes at least voicemail message.

According to one or more embodiments of this aspect, the information associated with the voicemail function is a list of URLs where each URL is associated with a respective voicemail message, and the at least one voicemail message destined for the digital assistant device is an encoded audio file. According to one or more embodiments of this aspect, the messages are HTTP/S messages. According to one or more embodiments of this aspect, the accessing of the voicemail system bypasses a telephony user interface of the voicemail system.

According to one or more embodiments of this aspect, the proxy network node is a trusted entity that is configured to perform voicemail box administration with the voicemail system for a subscriber associated with the digital assistant device. According to one or more embodiments of this aspect, the message destined for digital assistant device is based on retrieved audio data associated from the voicemail system that has been converted to audio data compatible with the digital assistant device. According to one or more embodiments of this aspect, the digital assistant device is a voice activated digital assistant device.

According to another aspect of the disclosure, a node is provided. The node includes processing circuitry configured to receive a request message for at least one voicemail message in a voicemail system in a fixed or cellular network, access the voicemail system to retrieve the at least one voicemail message where the accessing of the voicemail system is performed without establishing a voice channel in the fixed or cellular network, and return the at least one voicemail message.

According to one or more embodiments of this aspect, the request message is received, over the internet from a digital assistant device, and the at least one voicemail message is returned to the digital assistant device over the internet. According to one or more embodiments of this aspect, the processing circuitry is further configured to one or more of retrieve a pre-authentication indication for a digital assistant device and obtain authentication information to authenticate the digital assistant device. According to one or more embodiments of this aspect, the node is a trusted entity that is configured to perform voicemail box administration with the voicemail system for a subscriber associated with a digital assistant device.

According to one or more embodiments of this aspect, the processing circuitry is further configured to access the voicemail system for information associated with a list of URLs where each URL is associated with a respective voicemail message or the at least one voicemail message, and communicate the information associated with a list of URLs to a digital assistant device where the request message indicates at least one of URLs from the list of URLs for retrieval from the voicemail system. According to one or more embodiments of this aspect, the at least one voicemail message destined for a digital assistant device is an encoded audio file. According to one or more embodiments of this aspect, the at least one voicemail messages destined for a digital assistant device is based on retrieved audio data associated the voicemail system that has been converted to audio data compatible with the digital assistant device.

According to one or more embodiments of this aspect, the digital assistant device is a voice activated digital assistant device. According to one or more embodiments of this aspect, the messages are HTTP/S messages. According to one or more embodiments of this aspect, the accessing of the voicemail system bypasses a telephony user interface of the voicemail system. According to another aspect of the disclosure, a method implemented by a node is provided. A request message for at least one voicemail message in a voicemail system in a fixed or cellular network is received. The voicemail system is accessed to retrieve the at least one voicemail message where the accessing of the voicemail system is performed without establishing a voice channel in the fixed or cellular network. The at least one voicemail message is returned. According to one or more embodiments of this aspect, the request message is received, over the internet from a digital assistant device, and the at least one voicemail message is returned to the digital assistant device over the internet.

According to one or more embodiments of this aspect, one or more of retrieving a pre-authentication indication for a digital assistant device and obtaining authentication information to authenticate the digital assistant device are performed. According to one or more embodiments of this aspect, the node is a trusted entity that is configured to perform voicemail box administration with the voicemail system for a subscriber associated with a digital assistant device. According to one or more embodiments of this aspect, the voicemail system is accessed for information associated with a list of URLs where each URL is associated with a respective voicemail message of the at least one voicemail messages. The information associated with a list of URLs is communicated to a digital assistant device where the request message indicates at least one of URLs from the list of URLs for retrieval from the voicemail system.

According to one or more embodiments of this aspect, the at least one voicemail messages destined for a digital assistant device is an encoded audio file. According to one or more embodiments of this aspect, the at least one voicemail messages destined for a digital assistant device are based on retrieved audio data associated the voicemail system that has been converted to audio data compatible with the digital assistant device. According to one or more embodiments of this aspect, the digital assistant device is a voice activated digital assistant device. According to one or more embodiments of this aspect, the messages are HTTP/S messages. According to one or more embodiments of this aspect, the accessing of the voicemail system bypasses a telephony user interface of the voicemail system.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 16 is a diagram of an example of a visual display for a subscriber device that uses the voice user interface according to some embodiments of the present disclosure.

DETAILED DESCRIPTION

Figure 1:
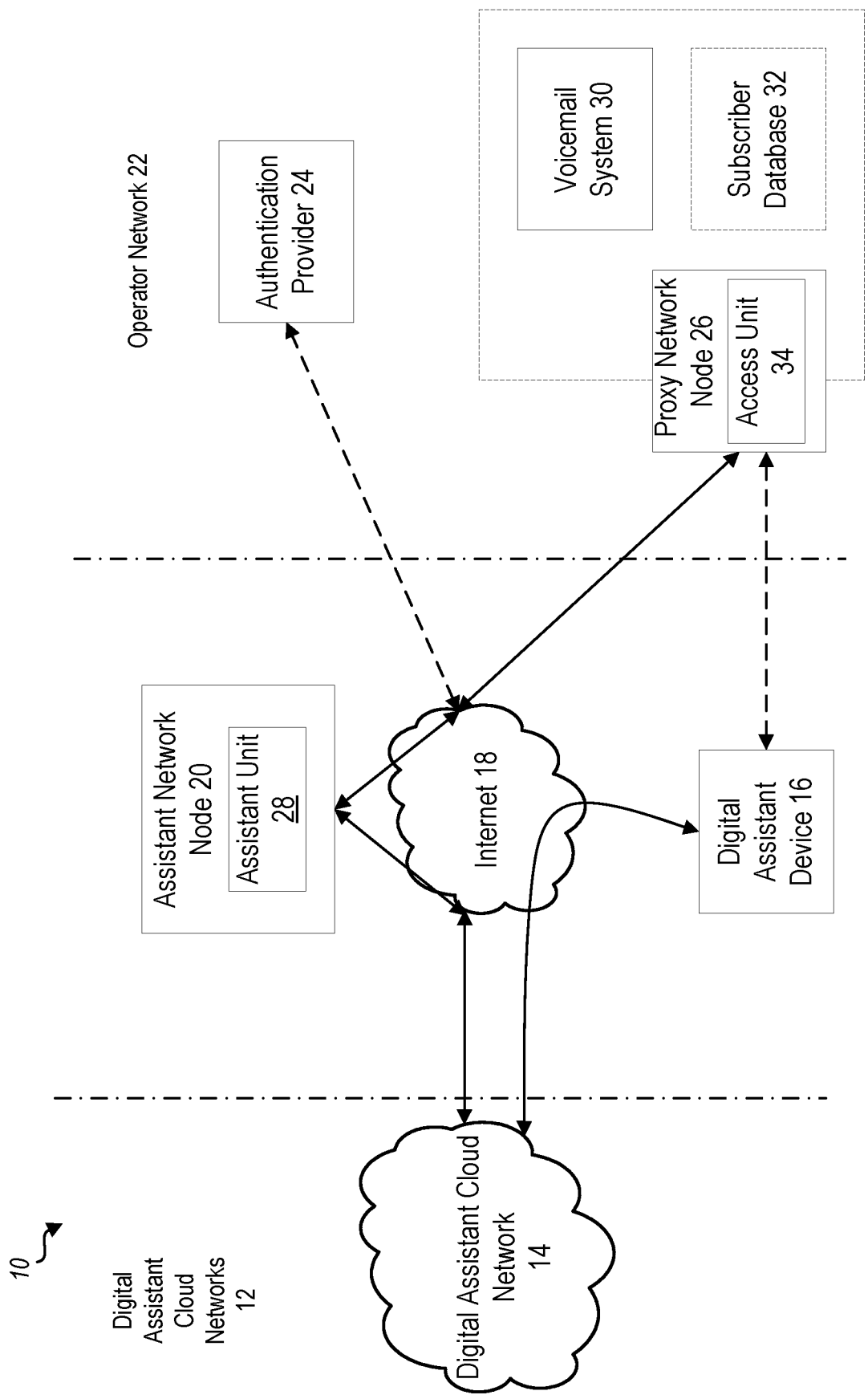
FIG. 1 is a schematic diagram of an exemplary network architecture illustrating a communication system according to the principles in the present disclosure.

Before describing in detail exemplary embodiments, it is noted that the embodiments reside primarily in combinations of apparatus components and processing steps related to accessing voicemail functions of a voicemail system without relying on a voice channel such that, in one or more embodiments only audio files are retrieved. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio and/or communication network which may further comprise any of voicemail nodes, voicemail system, proxy node, server node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), a server proxy application programming interface (API) in a private or public cloud network or operator network, proxy network node such as an access proxy API, etc.

In some embodiments, the non-limiting terms device (e.g., digital assistant device) or a user equipment (UE) are used interchangeably. In one or more embodiments, a digital assistant device may refer to a device that operates using one or more software applications that can receive commands, requests, etc., from a user, translate them into text commands, requests, etc., such as JavaScript Object Notation (JSON) "intents" that correspond to action(s) that fulfill the command, request, etc., and communicate with a digital assistant cloud network to receive "answers" to the commands/requests, etc. In one or more embodiments, a UE could be a digital assistant device or could include/comprise a digital assistant device. In one or more embodiments, the commands may be voice commands, touch commands, eye movement based commands, motion based commands, etc. In one or more embodiments, the received answers may be communicated to the user via one or more of an audio output device, visual display, haptic device, etc. The device herein can be any type of wireless and/or wired device capable of communicating with one or more network and/or cloud networks such as a digital assistance cloud. The device may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), touchscreen device, smart device, laptop mounted equipment (LME), USB dongles, Customer Premises Equipment (CPE), an Internet of Things (IoT) device, or a Narrowband IoT (NB-IOT) device, etc. In one or more embodiments, the digital assistant device one or more of smart glasses such as GOOGLE glass device, smart speaker such as an ALEXA enabled smart speaker, etc., where these devices may be modified to perform the functions described herein. In one or more embodiments, ALEXA could be installed on the device or UE described herein. The digital assistant device may be configured to use speech synthesis markup language (SSML) among other computer languages. In one or more embodiments, the digital assistant device may request an input such as a voice input, touch input, etc., and/or may prompt for a pin/password input.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note further, that functions described herein as being performed by a device or a network node may be distributed over a plurality of devices and/or network nodes. In other words, in one or more embodiments, it is contemplated that the functions of one or more network nodes described herein are not limited to performance by a single physical device/node and, in fact, can be distributed among several physical devices/nodes.

An indication generally may explicitly and/or implicitly indicate the information. An implicit indication may for example be based on position and/or resource used for transmission. An explicit indication may for example be based on a parametrization with one or more parameters, and/or one or more index or indices, and/or one or more predefined bits or bit patterns representing the information.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide accessing voicemail functions of a voicemail system without relying and/or using a voice channel for the access.

Referring now to the drawing figures, in which like elements are referred to by like reference numerals, there is shown in FIG. 1 a schematic diagram of a communication system 10, which comprises a digital assistant cloud networks 12 that may include and/or correspond to one or more digital assistant cloud networks 14 that may be provided and/or configured to support respective entities. The digital assistant cloud network 14 may be in communication with one or more digital assistant devices 16 such as via the internet 18. Communication system 10 includes one or more assistance network nodes 20 that may be in communication with one or more entities in communication system 10 such as with operator network 22, authentication provider 24, proxy network node 26, among other entities, such a via internet 18. Assistance network node 20 may be the contact point or proxy between the digital assistant cloud networks 12 and operator network 22. Assistant network node 20 is configured to include assistant unit 28 which is configured to perform one or more assistant network node 20 functions as described herein such as with respect to accessing voicemail functions of a voicemail system without relying on a voice channel. In one or more embodiments, the assistant network node 20 may be implemented in a private or public cloud network or in an operator network.

Operator network 22 may include one or more authentication providers 24 for authenticating one or more of a request, communication, session, message, etc. Operator network 22 may include proxy network node 26 that is in communication with one or more voicemail systems 30 and may optionally communication with one or more subscriber databases 32, among other entities in communication system 10. In one or more embodiments, the voicemail system may be the voicemail function(s) of the PLMN. Proxy network node 26 may be configured to be an access proxy application program interface (API) to the voicemail system 30. Proxy network node 26 is configured to include access unit 34 which is configured to perform one or more proxy network node 26 functions as described here such as with respect to accessing voicemail functions of a voicemail system without relying on a voice channel. Voicemail system 30 may be configured to provide one or more voicemail functions that may, for example, be triggered and/or initiated by the digital assistant device 16 such as to trigger/initiate one or more of storing, retrieving, forwarding, etc., voicemail and/or information related to voicemail for one or more subscribers, among other functions of a voicemail system 30. Subscriber database 32 may store information related to one or more voicemail subscribers.

Example implementations, in accordance with one or more embodiments, the assistant network node 20, and proxy network node 26 discussed in the preceding paragraphs will now be described with reference to FIG. 2.

In a communication system 10, an assistant network node 20 comprises hardware (HW) 36 including a communication interface 38 configured to set up and/or maintain and/or participate in a wired or wireless connection with one or more of digital assistant cloud network 14, authentication provider 24 and proxy network node 26, among other entities in communication system 10. The assistant network node 20 further comprises processing circuitry 40, which may have storage and/or processing capabilities. The processing circuitry 40 may include a processor 42 and memory 44. In particular, in addition to or instead of a processor, such as a central processing unit, and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 42 may be configured to access (e.g., write to and/or read from) memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 40 may be configured to control any of the methods and/or processes described herein and/or to cause such methods, and/or processes to be performed, e.g., by assistant network node 20. Processor 42 corresponds to one or more processors 42 for performing assistant network node 20 functions described herein. The assistant network node 20 includes memory 44 that is configured to store data, programmatic software code and/or other information described herein. In some embodiments, the software 46 may include instructions that, when executed by the processor 42 and/or processing circuitry 40, causes the processor 42 and/or processing circuitry 40 to perform the processes described herein with respect to the assistant network node 20. The instructions may be software associated with the assistant network node 20.

The software 46 may be executable by the processing circuitry 40. The software 46 may include one or more software applications. The processing circuitry 40 of the assistant network node 20 may include an assistant unit 28 configured to perform one or more assistant network node 20 functions described herein such as with respect to accessing voicemail functions of a voicemail system without relying on a voice channel.

The communication system 10 further includes a proxy network node 26 provided in a communication system 10 and including hardware 48 enabling it to communicate with one or more entities in communication system 10 such as with one or more of the assistant network nodes 20, voicemail system 30, subscriber database 32, etc. The hardware 48 may include a communication interface 50 for setting up and/or maintaining and/or participating in a wired or wireless connection with one or more entities in communicating system 10.

In the embodiment shown, the hardware 48 of the proxy network node 26 further includes processing circuitry 52. The processing circuitry 52 may include a processor 54 and a memory 56. In particular, in addition to or instead of a processor, such as a central processing unit, and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 54 may be configured to access (e.g., write to and/or read from) the memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the proxy network node 26 further has software 58 stored internally in, for example, memory 56, or stored in external memory (e.g., database, storage array, network storage device, etc.) accessible by the proxy network node 26 via an external connection. The software 58 may be executable by the processing circuitry 52. The processing circuitry 68 may be configured to control any of the methods and/or processes described herein and/or to cause such methods, and/or processes to be performed, e.g., by proxy network node 26. Processor 54 corresponds to one or more processors 54 for performing proxy network node 26 functions described herein. The memory 56 is configured to store data, programmatic software code and/or other information described herein. In some embodiments, the software 58 may include instructions that, when executed by the processor 54 and/or processing circuitry 52, causes the processor 54 and/or processing circuitry 52 to perform the processes described herein with respect to proxy network node 26. For example, processing circuitry 52 of the proxy network node 26 may include access unit 34 configured to perform one or more proxy network node 26 functions as described herein such as with respect to accessing voicemail functions of a voicemail system without relying on a voice channel.

Figure 2:
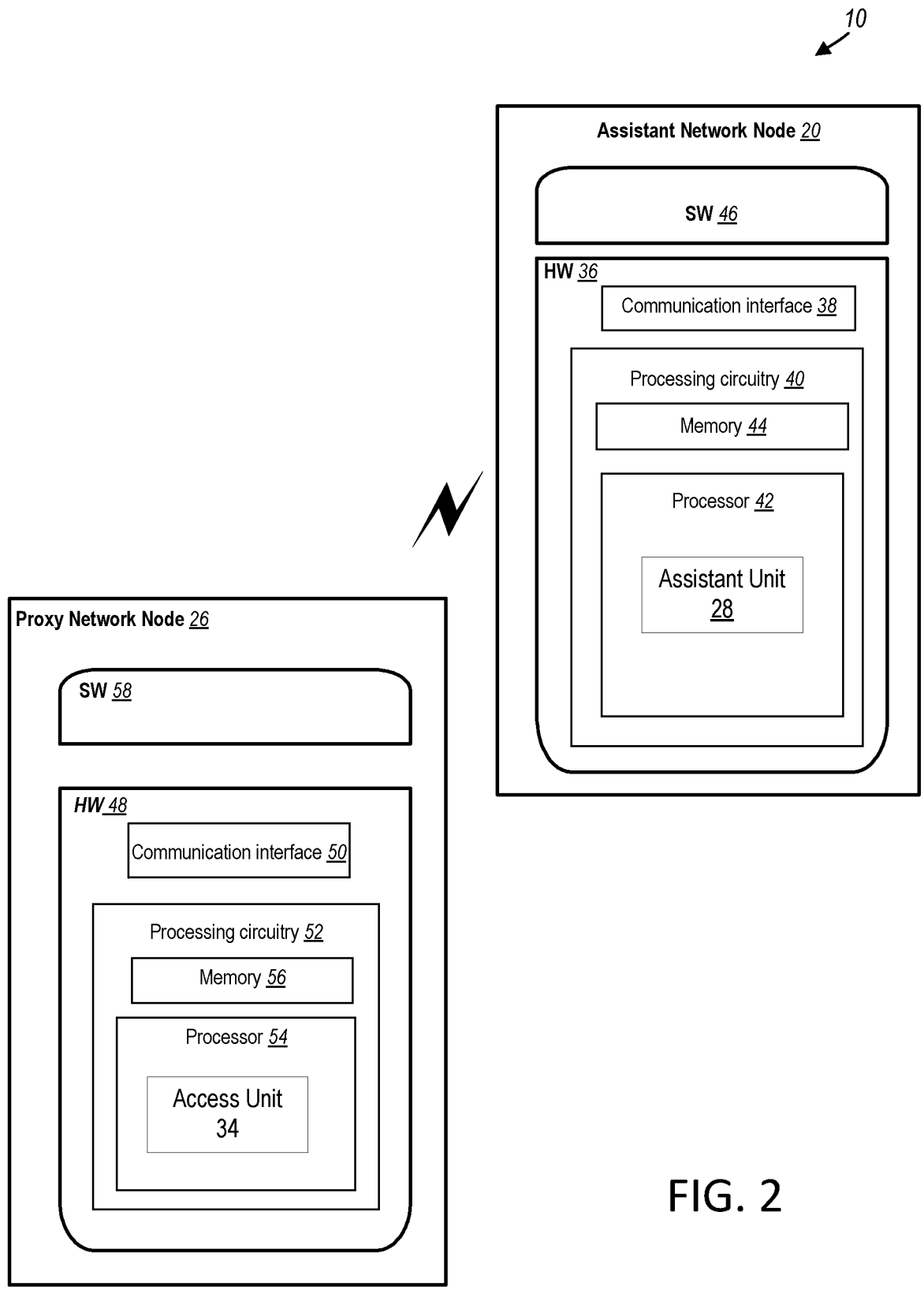
FIG. 2 is a block diagram of the assistant network node and proxy network node according to some embodiments of the present disclosure.

In some embodiments, the inner workings of the assistant network node 20 and proxy network node 26 may be as shown in FIG. 2 and independently, the surrounding network topology may be that of FIG. 1. Although FIGS. 1 and 2 show various "units" such as assistant unit 28, and access unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Further, in one or more embodiments, digital assistant device 16 includes functionality of the assistant network node 20 such that digital assistant device 16 may communicate with operator network node 22 such as with the proxy network node 26.

Figure 3:
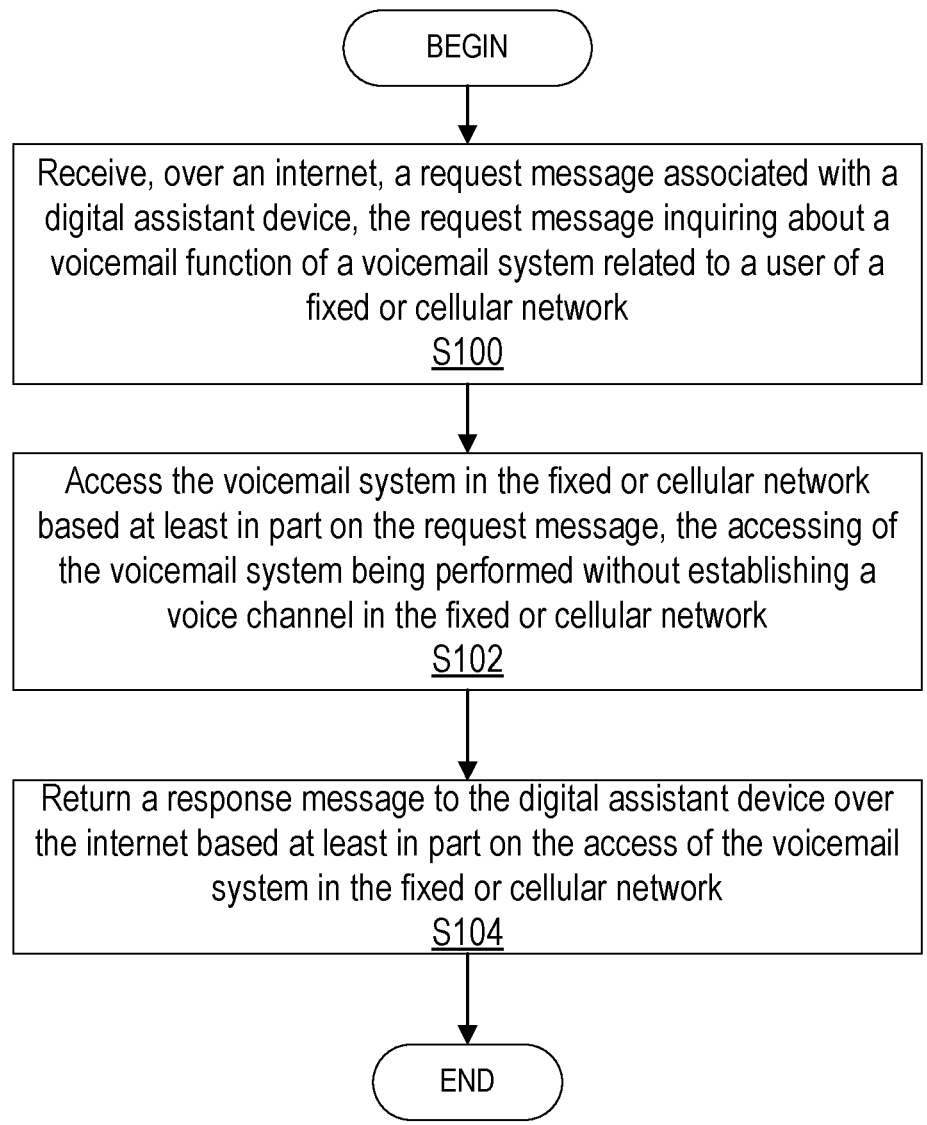
FIG. 3 is a flowchart of an exemplary process in an assistant network node according to some embodiments of the present disclosure.

FIG. 3 is a flowchart of an exemplary process in an assistant network node 20 according to one or more embodiments of the present disclosure. One or more Blocks and/or functions performed by assistant network node 20 may be performed by one or more elements of the assistant network nodes 20 such as by assistant unit 28 in processing circuitry 40, processor 42, communication interface 38, etc. In one or more embodiments, assistant network node 20 such as via one or more of processing circuitry 40, processor 42, assistant unit 28 and communication interface 38 is configured to receive (Block S100), over an internet, a request message associated with a digital assistant device 16 where the request message inquiries about a voicemail function of a voicemail system 30 related to a user of a fixed or cellular network, as described herein. In one or more embodiments, assistant network node 20 such as via one or more of processing circuitry 40, processor 42, assistant unit 28 and communication interface 38 is configured to access (Block S102) the voicemail system in the fixed or cellular network based at least in part on the request message where the accessing of the voicemail system 30 is performed without establishing a voice channel in the fixed or cellular network, as described herein. In one or more embodiments, assistant network node 20 such as via one or more of processing circuitry 40, processor 42, assistant unit 28 and communication interface 38 is configured to return (Block S104) a response message to the digital assistant device 16 over the internet based at least in part on the access of the voicemail system 30 in the fixed or cellular network, as described herein.

According to one or more embodiments, the accessing of the voicemail system 30 in the fixed or cellular network includes: transmitting a first retrieval message to the proxy network node 26 where the first request message configured to cause the proxy network node 26 to access a voicemail system 30 to retrieve: information associated with the digital assistant device 16 and a voicemail function of the voicemail system 30 in the fixed or cellular network; and at least one voicemail message associated with the information; receive a first reply message from the proxy network node 26 including: information associated with the voicemail function of the voicemail system 30 in the fixed or cellular network and the at least one voicemail message. The response message to the digital assistant device 16 includes the at least one voicemail message.

According to one or more embodiments, the accessing of the voicemail system 30 in the fixed or cellular network includes: transmitting a first retrieval message to the proxy network node 26 where the first retrieval message is configured to cause the proxy network node 26 to access the voicemail system 30 to retrieve information associated with the digital assistant device 16 and a voicemail function of the voicemail system 30 in the fixed or cellular network, receive a first reply message from the proxy network node 26 indicating the information associated with the voicemail function of the voicemail system 30 in the fixed or cellular network, transmitting a second retrieval message associated with the digital assistant device 16 to the proxy network node 26 where the second retrieval message is based at least in part on the information associated with the voicemail function of the voicemail system 30 in the fixed or cellular network and configured to cause retrieval of the at least one voicemail message, and receiving the at least one voicemail message from the proxy network node 26 based at least in part on the second retrieval message. The response message includes the at least voicemail message destined for the digital assistant device 16.

According to one or more embodiments, the messages are Hypertext Transfer Protocol Secure (HTTP/S) messages. According to one or more embodiments, the assistant network node 20 and/or the communication interface 50 and/or the processing circuitry 52 is further configured to one or more of retrieve a pre-authentication indication for the digital assistant device 16 and obtain authentication information to authenticate digital assistant device 16. According to one or more embodiments, the digital assistant device 16 is a voice activated digital assistant device 16.

Figure 4:
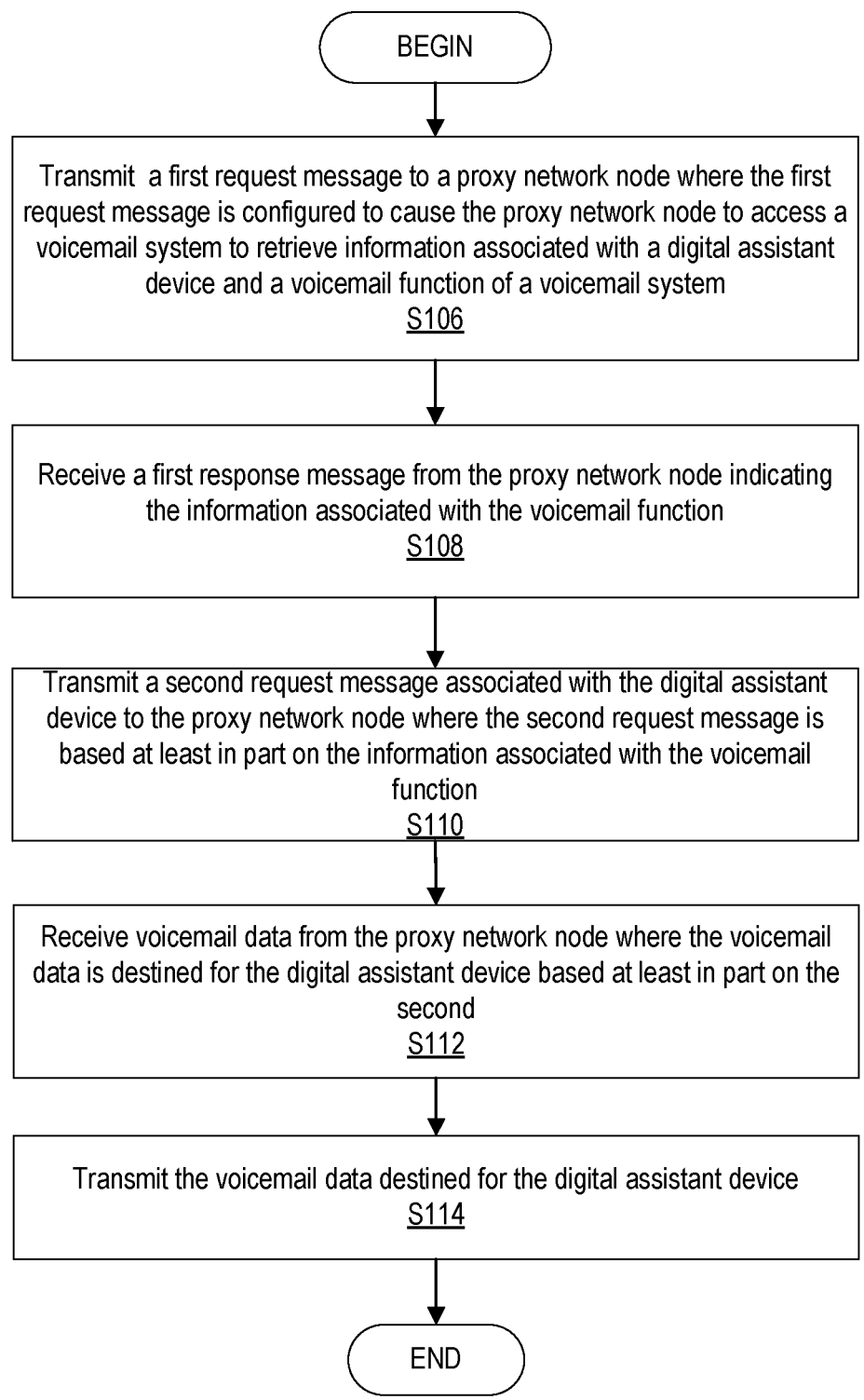
FIG. 4 is a flowchart of another exemplary process in an assistant network node according to some embodiments of the present disclosure.

FIG. 4 is a flowchart of another exemplary process in an assistant network node 20 according to one or more embodiments of the present disclosure. One or more Blocks and/or functions performed by assistant network node 20 may be performed by one or more elements of the assistant network nodes 20 such as by assistant unit 28 in processing circuitry 40, processor 42, communication interface 38, etc. In one or more embodiments, assistant network node 20 such as via one or more of processing circuitry 40, processor 42, assistant unit 28 and communication interface 38 is configured to transmit (Block S106) a first request message (e.g., HTTP/HTTPS message) to a proxy network node 26 where the first request message is configured to cause the proxy network node 26 to access a voicemail system 30 to retrieve information associated with a digital assistant device 16 and a voicemail function of a voicemail system 30, as described herein.

In one or more embodiments, assistant network node 20 such as via one or more of processing circuitry 40, processor 42, assistant unit 28 and communication interface 38 is configured to receive (Block S108) a first response message (e.g., HTTP/HTTPS message) from the proxy network node 26 indicating the information associated with the voicemail function, as described herein. In one or more embodiments, assistant network node 20 such as via one or more of processing circuitry 40, processor 42, assistant unit 28 and communication interface 38 is configured to transmit (Block S110) a second request message associated with the digital assistant device 16 to the proxy network node 26 where the second request message (e.g., HTTP/HTTPS message) is based at least in part on the information associated with the voicemail function, as described herein. In one or more embodiments, assistant network node 20 such as via one or more of processing circuitry 40, processor 42, assistant unit 28 and communication interface 38 is configured to receive (Block S112) voicemail data from the proxy network node 26 where the voicemail data is destined for the digital assistant device 16 based at least in part on the second request message, as described herein.

In one or more embodiments, the assistant network node 20 such as via one or more of processing circuitry 40, processor 42, assistant unit 28 and communication interface 38 is configured to transmit (Block S114) the voicemail data destined for the digital assistant device 16, as described herein. The first request message, second request message, first response message and voicemail data are communicated without using a voice channel and/or setting up a voice communication call/channel in, for example, the PLMN or other fixed network that involves a dedicated voice channel to support communication.

According to one or more embodiments, the first request message, second request message and first response message are HTTP/S (HTTPS) messages. According to one or more embodiments, the assistant network node 20 and/or the communication interface 38 and/or the processing circuitry 40 is further configured to one or more of retrieve a pre-authentication indication for the digital assistant device 16 and obtain authentication information to authenticate digital assistant device 16.

Figure 5:
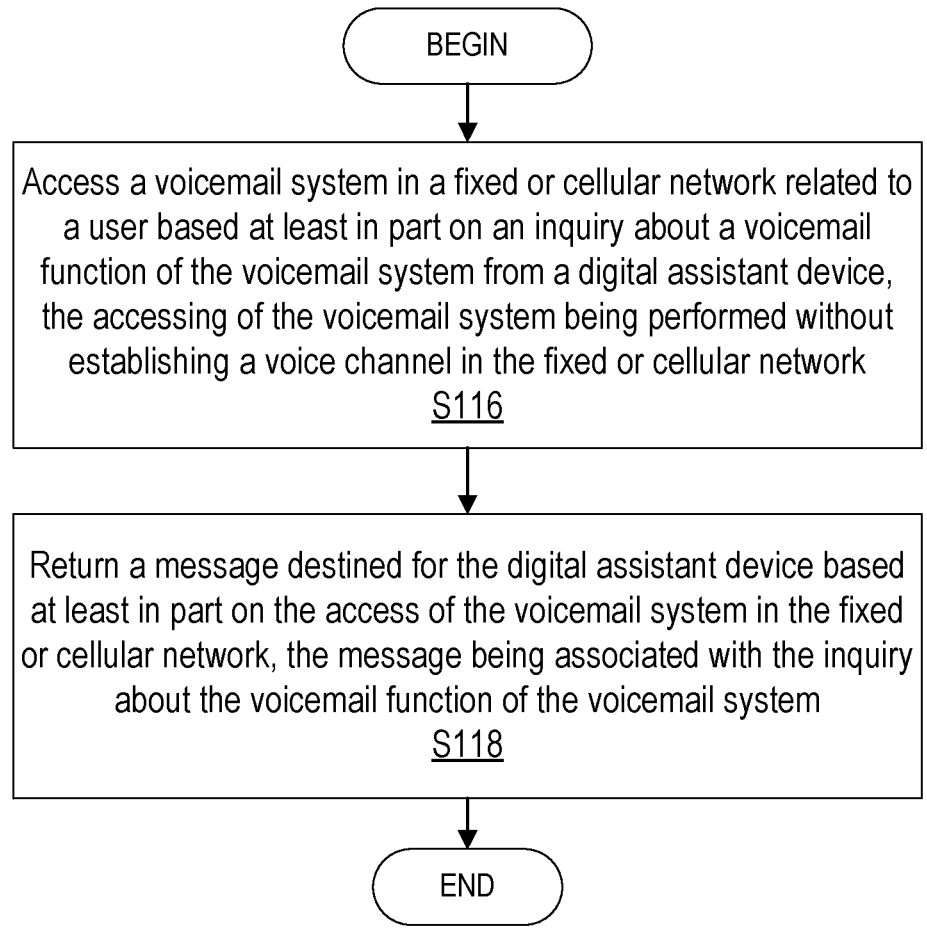
FIG. 5 is a flowchart of an exemplary process in a proxy network node according to some embodiments of the present disclosure.

FIG. 5 is a flowchart of an exemplary process in a proxy network node 26 according to one or more embodiments of the present disclosure. One or more Blocks and/or functions performed by proxy network node 26 may be performed by one or more elements of proxy network node 26 such as by access unit 34 in processing circuitry 52, processor 54, communication interface 50, etc. In one or more embodiments, proxy network node 26 such as via one or more of processing circuitry 52, processor 54, access until 34 and communication interface 50 is configured to access (Block S116) a voicemail system 30 in a fixed or cellular network related to a user based at least in part on an inquiry about a voicemail function of the voicemail system 30 from a digital assistant device 16 where the accessing of the voicemail system 30 is performed without establishing a voice channel in the fixed or cellular network, as described herein. In one or more embodiments, proxy network node 26 such as via one or more of processing circuitry 52, processor 54, access until 34 and communication interface 50 is configured to return (Block S118) a message destined for the digital assistant device 16 based at least in part on the access of the voicemail system 30 in the fixed or cellular network where the message is associated with the inquiry about the voicemail function of the voicemail system 30, as described herein.

According to one or more embodiments, the proxy network node 26 is further configured to, and/or the communication interface 50 and/or the processing circuitry 52 is further configured to: receive a first retrieval message where the first retrieval message is configured to cause the proxy network node 26 to access a voicemail system 30 to retrieve: information associated with the digital assistant device 16 and a voicemail function of the voicemail system 30 in the fixed or cellular network and at least one voicemail message associated with the information; transmit a first reply message including: information associated with the voicemail function of the voicemail system 30 in the fixed or cellular network, and the at least one voicemail message. The message destined to the digital assistant device 16 includes the at least one voicemail message.

According to one or more embodiments, the proxy network node 26 is further configured to, and/or the communication interface 50, radio interface and/or the processing circuitry 52 is further configured to: receive a first retrieval message where the first retrieval message is configured to cause the proxy network node 26 to access the voicemail system 30 to retrieve information associated with the digital assistant device 16 and a voicemail function of the voicemail system 30 in the fixed or cellular network; transmit a first reply message from the proxy network node 26 indicating the information associated with the voicemail function of the voicemail system 30 in the fixed or cellular network; receive a second retrieval message associated with the digital assistant device 16 to the proxy network node 26 where the second retrieval message is based at least in part on the information associated with the voicemail function of the voicemail system 30 in the fixed or cellular network and configured to cause retrieval of the at least one voicemail message, and transmit the at least one voicemail message based at least in part on the second retrieval message. The message destined for the digital assistant device 16 includes the at least voicemail message.

According to one or more embodiments, the messages are HTTP/S messages. According to one or more embodiments, the accessing of the voicemail system 30 bypasses a telephony user interface of the voicemail system 30. According to one or more embodiments, the proxy network node 26 is a trusted entity that is configured to perform voicemail box administration with the voicemail system 30 for a subscriber associated with the digital assistant device 16. According to one or more embodiments, the information associated with the voicemail function is a list of URLs where each URL is associated with a respective voicemail message. The at least one voicemail message destined for the digital assistant device 16 is an encoded audio file.

According to one or more embodiments, the message destined for digital assistant device 16 is based on retrieved audio data associated from the voicemail system 30 that has been converted to audio data compatible with the digital assistant device 16. According to one or more embodiments, the digital assistant device 16 is a voice activated digital assistant device 16.

Figure 6:
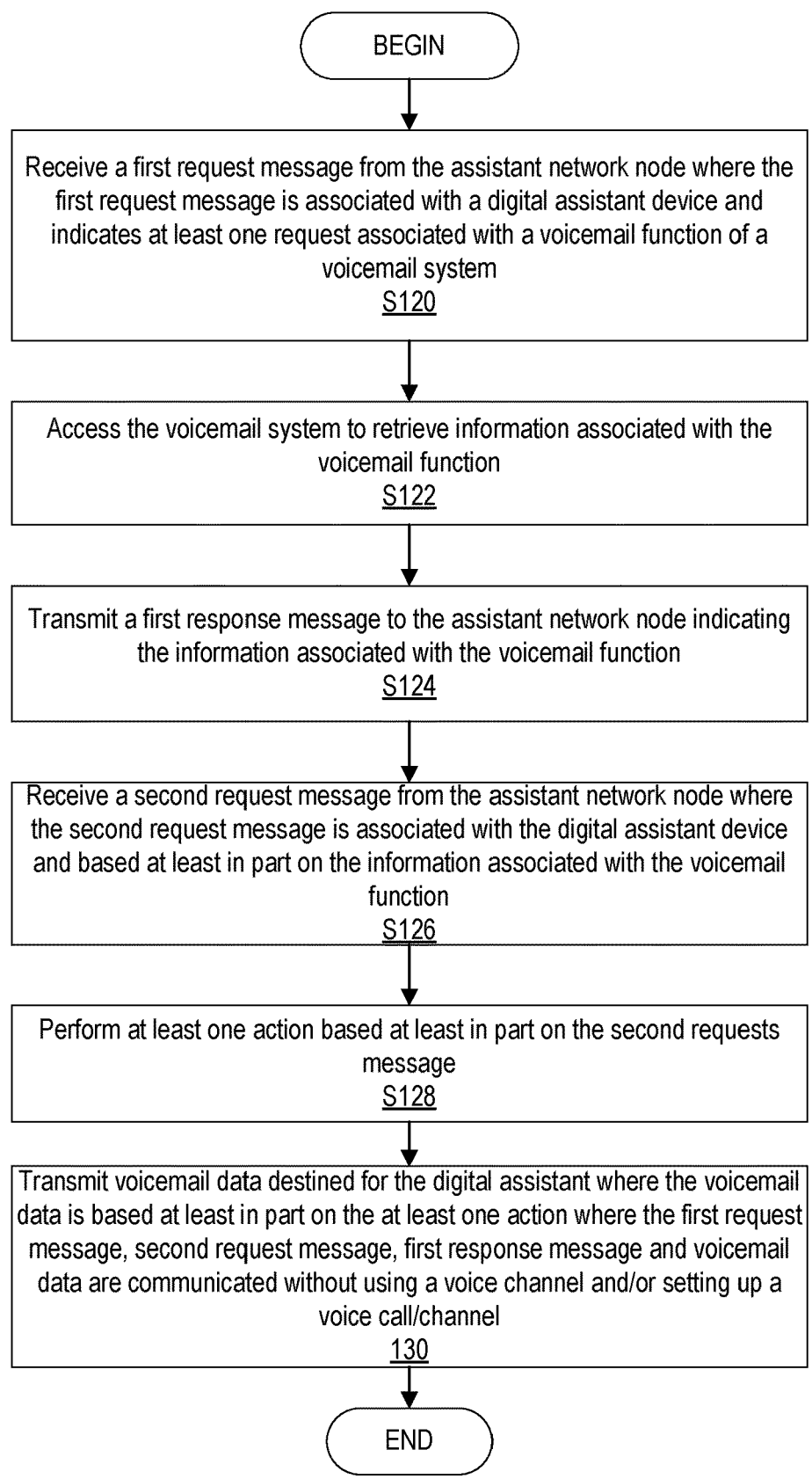
FIG. 6 is a flowchart of another exemplary process in a proxy network node according to some embodiments of the present disclosure.

FIG. 6 is a flowchart of another exemplary process in a proxy network node 26 according to one or more embodiments of the present disclosure. One or more Blocks and/or functions performed by proxy network node 26 may be performed by one or more elements of proxy network node 26 such as by access unit 34 in processing circuitry 52, processor 54, communication interface 50, etc. In one or more embodiments, proxy network node 26 such as via one or more of processing circuitry 52, processor 54, access until 34 and communication interface 50 is configured to receive (Block S120) a first request message (e.g., HTTP/HTTPS message) from the assistant network node 20 where the first request message is associated with a digital assistant device 16 and indicates at least one request associated with a voicemail function of a voicemail system 30, as described herein. In one or more embodiments, the voicemail function of voicemail system 30 includes a voicemail message function such as retrieval of a voicemail message. In one or more embodiments, proxy network node 26 such as via one or more of processing circuitry 52, processor 54, access until 34 and communication interface 50 is configured to access (Block S122) the voicemail system 30 to retrieve information associated with the voicemail function, as described herein.

In one or more embodiments, proxy network node 26 such as via one or more of processing circuitry 52, processor 54, access until 34 and communication interface 50 is configured to transmit (Block S124) a first response message (e.g., HTTP/HTTPS message) to the assistant network node 20 indicating the information associated with the voicemail function, as described herein. In one or more embodiments, proxy network node 26 such as via one or more of processing circuitry 52, processor 54, access until 34 and communication interface 50 is configured to receive (Block S126) a second request message (e.g., HTTP/HTTPS message) from the assistant network node 20 where the second request message is associated with the digital assistant device 16 and based at least in part on the information associated with the voicemail function, as described herein.

In one or more embodiments, proxy network node 26 such as via one or more of processing circuitry 52, processor 54, access until 34 and communication interface 50 is configured to perform (Block S128) at least one action based at least in part on the second requests message, as described herein. In one or more embodiments, proxy network node 26 such as via one or more of processing circuitry 52, processor 54, access until 34 and communication interface 50 is configured to transmit (Block S130) voicemail data destined for the digital assistant device 16 where the voicemail data is based at least in part on the at least one action, as described herein. The first request message, second request message, first response message and voicemail data are communicated without using a voice channel and/or setting up a voice call/channel.

According to one or more embodiments, the first request message, second request message and first response message are HTTP/S (HTTPS) messages. According to one or more embodiments, the messaging between the proxy network node 26 and the voicemail system 30 bypasses a telephony user interface of the voicemail system 30. According to one or more embodiments, the proxy network node 26 is a trusted entity that is configured to perform voicemail box administration with the voicemail system 30 for a subscriber associated with the digital assistant device 16. According to one or more embodiments, the information associated with the voicemail function is a list of URLs where each URL is associated with a respective voicemail message. The voicemail data destined for the digital assistant device 16 is an encoded audio file corresponding to a respective voicemail message. According to one or more embodiments, the at least one action includes retrieving data associated with the second request message from the voicemail system 30 and transcoding the data into the voicemail data.

Figure 7:
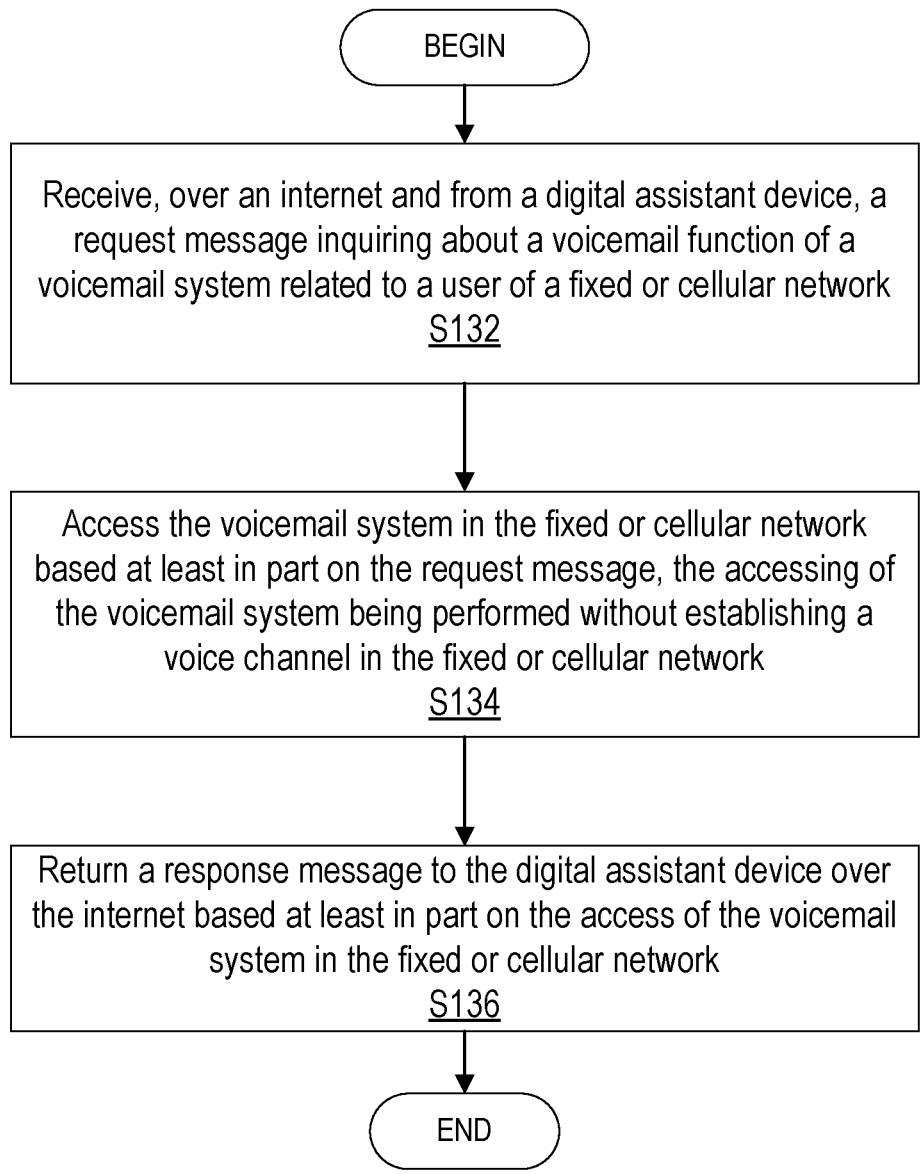
FIG. 7 is a flowchart of an exemplary process in a proxy network node where the proxy network node performs functionality of the assistant network node according to some embodiments of the present disclosure.

FIG. 7 is a flowchart of another exemplary process in a proxy network node 26 where the proxy network node performs functionality of the assistant network node according to one or more embodiments of the present disclosure. One or more Blocks and/or functions performed by proxy network node 26 may be performed by one or more elements of proxy network node 26 such as by access unit 34 in processing circuitry 52, assistant unit 28, processor 54, communication interface 50, etc. In one or more embodiments, proxy network node 26 such as via one or more of processing circuitry 52, processor 54, access unit 34, assistant unit 28 and communication interface 50 is configured to receive (Block S132), over an internet and from a digital assistant device, a request message inquiring about a voicemail function of a voicemail system related to a user of a fixed or cellular network, as described herein.

In one or more embodiments, proxy network node 26 such as via one or more of processing circuitry 52, processor 54, access unit 34, assistant unit 28 and communication interface 50 is configured to access (Block S134) the voicemail system 30 in the fixed or cellular network based at least in part on the request message where the accessing of the voicemail system is performed without establishing a voice channel in the fixed or cellular network, as described herein. In one or more embodiments, proxy network node 26 such as via one or more of processing circuitry 52, processor 54, access unit 34, assistant unit 28 and communication interface 50 is configured to return (Block S136) a response message to the digital assistant device over the internet based at least in part on the access of the voicemail system in the fixed or cellular network, as described herein.

According to one or more embodiments, the messages are HTTP/S messages. According to one or more embodiments, the accessing of the voicemail system bypasses a telephony user interface of the voicemail system. According to one or more embodiments, the node and/or the communication interface and/or the processing circuitry is further configured to one or more of retrieve a pre-authentication indication for the digital assistant device 16 and obtain authentication information to authenticate digital assistant device 16. According to one or more embodiments, the digital assistant device 16 is a voice activated digital assistant device 16.

According to one or more embodiments, the node and/or the communication interface 50 and/or the processing circuitry 52 is further configured to one or more of retrieve a pre-authentication indication for the digital assistant device 16 and get authentication information to authenticate digital assistant device 16. According to one or more embodiments, the accessing of the voicemail system 30 bypasses a telephony user interface of the voicemail system 30. According to one or more embodiments, the node is a trusted entity that is configured to perform voicemail box administration with the voicemail system 30 for a subscriber associated with the digital assistant device 16.

According to one or more embodiments, the information associated with the voicemail function is a list of URLs where each URL is associated with a respective voicemail message. The at least one voicemail message destined for the digital assistant device 16 is an encoded audio file. According to one or more embodiments, the message destined for digital assistant device 16 is based on retrieved audio data associated from the voicemail system 30 that has been converted to audio data compatible with the digital assistant device 16.

Figure 8:
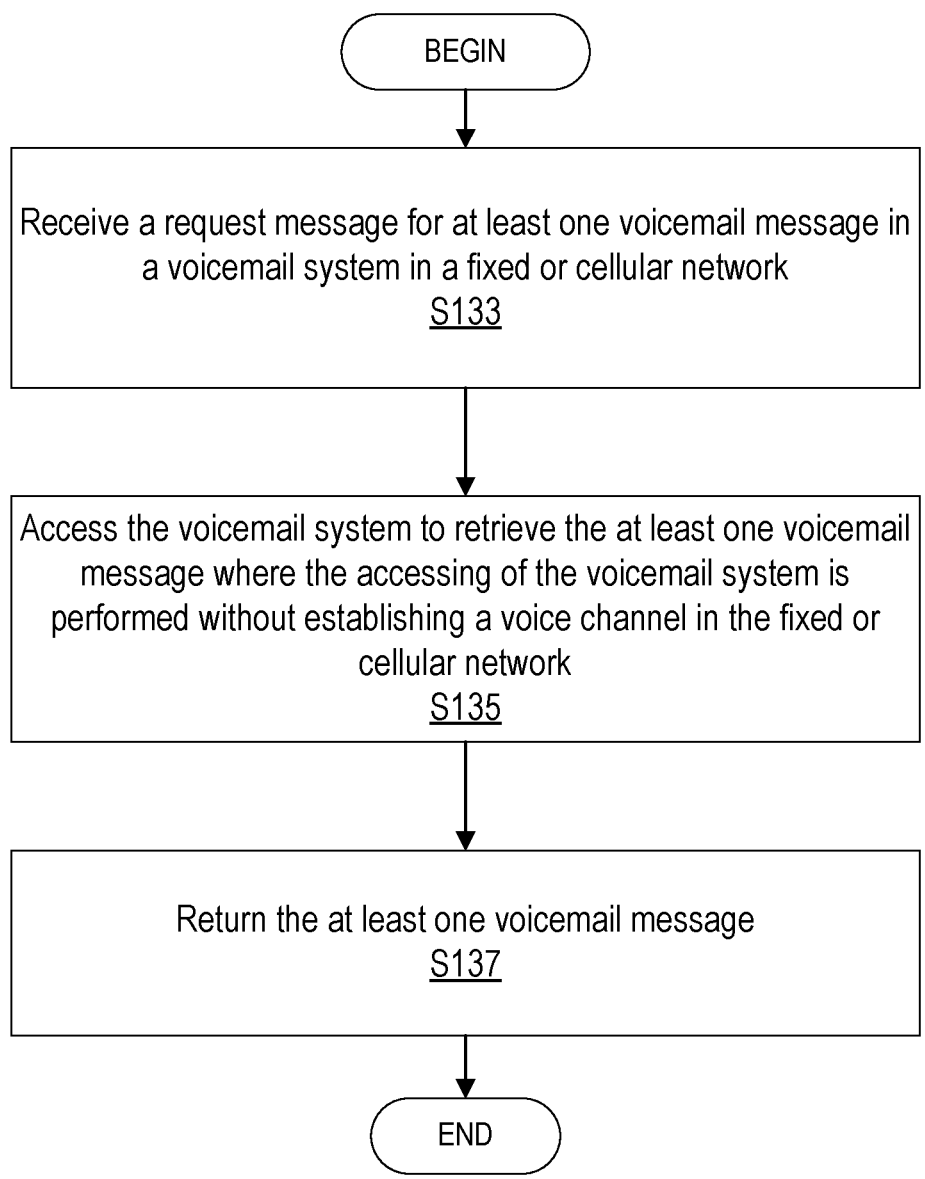
FIG. 8 is a flowchart of another example process in a proxy network node where the proxy network node performs functionality of the assistant network node according to some embodiments of the present disclosure.

FIG. 8 is a flowchart of another exemplary process in a proxy network node 26 where the proxy network node performs functionality of the assistant network node according to one or more embodiments of the present disclosure. One or more Blocks and/or functions performed by proxy network node 26 may be performed by one or more elements of proxy network node 26 such as by access unit 34 in processing circuitry 52, assistant unit 28, processor 54, communication interface 50, etc. In one or more embodiments, proxy network node 26 such as via one or more of processing circuitry 52, processor 54, access unit 34, assistant unit 28 and communication interface 50 is configured to receive (Block S133) a request message for at least one voicemail message in a voicemail system in a fixed or cellular network, as described herein. In one or more embodiments, proxy network node 26 such as via one or more of processing circuitry 52, processor 54, access unit 34, assistant unit 28 and communication interface 50 is configured to access (Block S135) the voicemail system to retrieve the at least one voicemail message where the accessing of the voicemail system is performed without establishing a voice channel in the fixed or cellular network, as described herein. In one or more embodiments, proxy network node 26 such as via one or more of processing circuitry 52, processor 54, access unit 34, assistant unit 28 and communication interface 50 is configured to return (Block S137) the at least one voicemail message, as described herein.

According to one or more embodiments, the request message is received, over the internet from a digital assistant device, and the at least one voicemail message is returned to the digital assistant device over the internet. According to one or more embodiments, the processing circuitry is further configured to one or more of retrieve a pre-authentication indication for a digital assistant device and obtain authentication information to authenticate the digital assistant device. According to one or more embodiments, the node is a trusted entity that is configured to perform voicemail box administration with the voicemail system for a subscriber associated with a digital assistant device.

According to one or more embodiments, the processing circuitry is further configured to access the voicemail system for information associated with a list of URLs where each URL is associated with a respective voicemail message or the at least one voicemail message, and communicate the information associated with a list of URLs to a digital assistant device where the request message indicates at least one of URLs from the list of URLs for retrieval from the voicemail system. According to one or more embodiments, the at least one voicemail message destined for a digital assistant device is an encoded audio file. According to one or more embodiments, the at least one voicemail messages destined for a digital assistant device is based on retrieved audio data associated the voicemail system that has been converted to audio data compatible with the digital assistant device.

According to one or more embodiments, the digital assistant device is a voice activated digital assistant device. According to one or more embodiments, the messages are HTTP/S messages. According to one or more embodiments, the accessing of the voicemail system bypasses a telephony user interface of the voicemail system.

Figure 9:
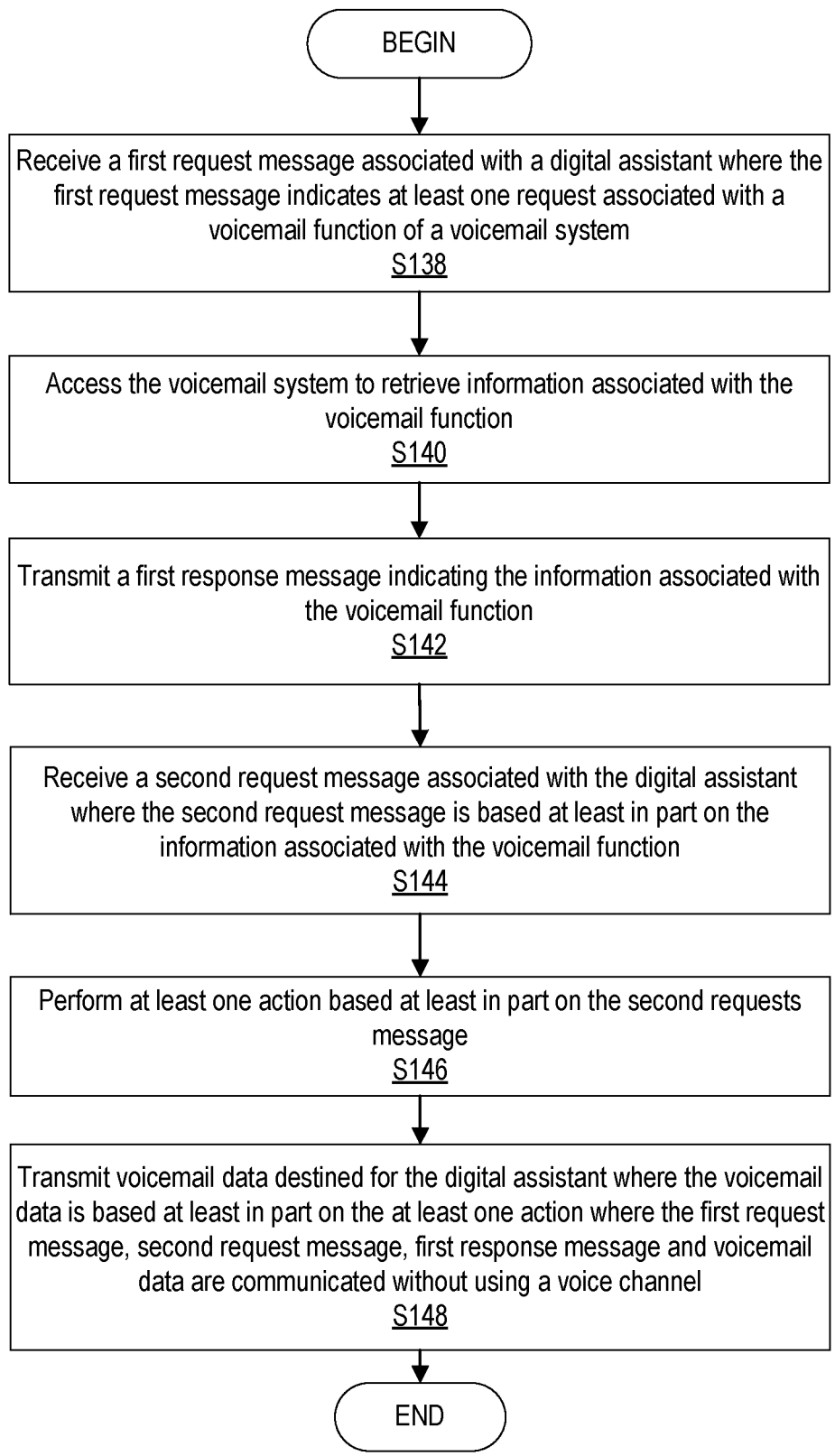
FIG. 9 is a flowchart of another exemplary process in a proxy network node where the proxy network node performs functionality of the assistant network node according to some embodiments of the present disclosure.

FIG. 9 is a flowchart of another exemplary process in proxy network node 26 according to one or more embodiments of the present disclosure. One or more Blocks and/or functions performed by proxy network node 26 may be performed by one or more elements of proxy network node 26 such as by access unit 34 in processing circuitry 52, processor 54, communication interface 50, etc. In one or more embodiments, proxy network node 26 such as via one or more of processing circuitry 52, processor 54, access until 34 and communication interface 50 is configured to receive (Block S138) a first request message (e.g., HTTP/HTTPS message) associated with a digital assistant device 16 where the first request message indicates at least one request associated with a voicemail function of a voicemail system 30, as described herein. In one or more embodiments, the voicemail function of voicemail system 30 includes a voicemail message function such as retrieval of a voicemail message. In one or more embodiments, proxy network node 26 such as via one or more of processing circuitry 52, processor 54, access until 34 and communication interface 50 is configured to access (Block S140) the voicemail system 30 to retrieve information associated with the voicemail function, as described herein.

In one or more embodiments, proxy network node 26 such as via one or more of processing circuitry 52, processor 54, access until 34 and communication interface 50 is configured to transmit (Block S142) a first response message indicating the information associated with the voicemail function, as described herein. In one or more embodiments, proxy network node 26 such as via one or more of processing circuitry 52, processor 54, access until 34 and communication interface 50 is configured to receive (Block S144) a second request message (e.g., HTTP/HTTPS message) associated with the digital assistant device 16 where the second request message is based at least in part on the information associated with the voicemail function, as described herein. In one or more embodiments, proxy network node 26 such as via one or more of processing circuitry 52, processor 54, access until 34 and communication interface 50 is configured to perform (Block S146) at least one action based at least in part on the second requests message, as described herein. In one or more embodiments, proxy network node 26 such as via one or more of processing circuitry 52, processor 54, access until 34 and communication interface 50 is configured to transmit (Block S148) voicemail data destined for the digital assistant device 16 where the voicemail data is based at least in part on the at least one action, as described herein. The first request message, second request message, first response message and voicemail data are communicated without using a voice channel. According to one or more embodiments, the first request message, second request message and first response message are HTTP/S (HTTPS) messages.

According to one or more embodiments, the proxy network node 26 and/or the communication interface 50 and/or the processing circuitry 52 is further configured to one or more of retrieve a pre-authentication indication for the digital assistant device 16 and get authentication information to authenticate digital assistant device 16. According to one or more embodiments, the messaging between the proxy network node 26 and the voicemail system 30 bypasses a telephony user interface of the voicemail system 30. According to one or more embodiments, the proxy network node 26 is a trusted entity that is configured to perform voicemail box administration with the voicemail system 30 for a subscriber associated with the digital assistant device 16.

According to one or more embodiments, the information associated with the voicemail function is a list of URLs where each URL being associated with a respective voicemail message. The voicemail data destined for the digital assistant device 16 is an encoded audio file corresponding to a respective voicemail message. According to one or more embodiments, the at least one action includes retrieving data associated with the second request message from the voicemail system 30 and transcoding the data into the voicemail data.

Having described the general process flow of arrangements of the disclosure and having provided examples of hardware and software arrangements for implementing the processes and functions of the disclosure, the sections below provide details and examples of arrangements for accessing voicemail functions of a voicemail system 30 without relying on a voice channel for the access.

Further, having generally described arrangements for accessing voicemail functions of a voicemail system 30 without relying on a voice channel, details for these arrangements, functions and processes are provided as follows, and which may be implemented by the assistant network node 20 and proxy network node 26.

Figure 10:
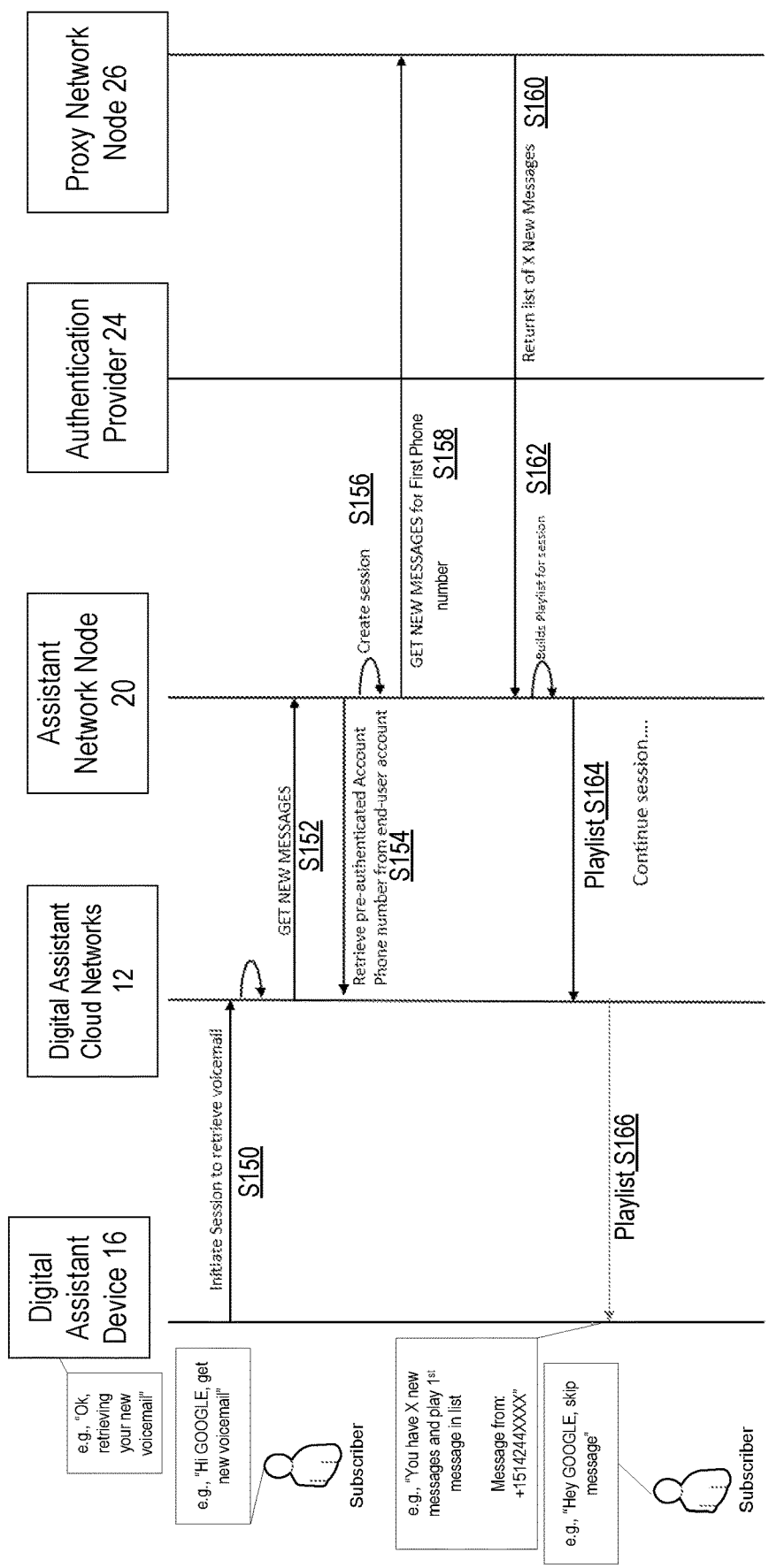
FIG. 10 is a signaling diagram of an example of an authentication process for subscriber authentication for retrieving voicemail and/or performing a voicemail function according to some embodiments of the present disclosure.

FIG. 10 is a signaling diagram of an example of an authentication process for subscriber authentication for retrieving voicemail and/or performing a voicemail function according to some embodiments of the present disclosure. The digital assistant device 16 is configured to initiate (Block S150) a session with the digital assistant cloud networks 12 to retrieve voicemail. The digital assistant cloud networks 12 is configured to initiate the session and transmits (Block S152) a GET NEW messages command/requests to the assistant network node 20. The assistant network node 20 is configured to retrieve pre-authenticated account phone number (i.e., a first phone number that is part of pre-authenticated subscriber information) from the end-user account and create a session (Blocks S154 and S156). In one or more embodiments, the pre-authenticated subscriber information corresponds to information resulting from an authentication process such as a subscriber registering the digital assistant device 16 where the pre-authenticated subscriber information may be stored at the digital assistant cloud networks 12. The assistant network node 20 is configured to transmits to the proxy network node 26 (Block S158) a GET NEW messages command/request for the first phone number associated with Block S154.

The proxy network node 26 is configured to retrieve a list of messages from the voicemail system 30, create a list of X new messages and return a list of the X new messages to the assistant network node 20 (Block S160). The assistant network node 20 is configured to build (Block S162) a playlist for the session based at least in part on the received list of X new messages. The assistant network node 20 is configured to transmit the playlist to the digital assistant cloud networks 12 where the digital assistant cloud networks 12 is configured to transmit the playlist to the digital assistant device 16 for playback of the message (Block S164 and S166). The session may continue such as to allow other voicemail functions to be performed.

Figure 11:
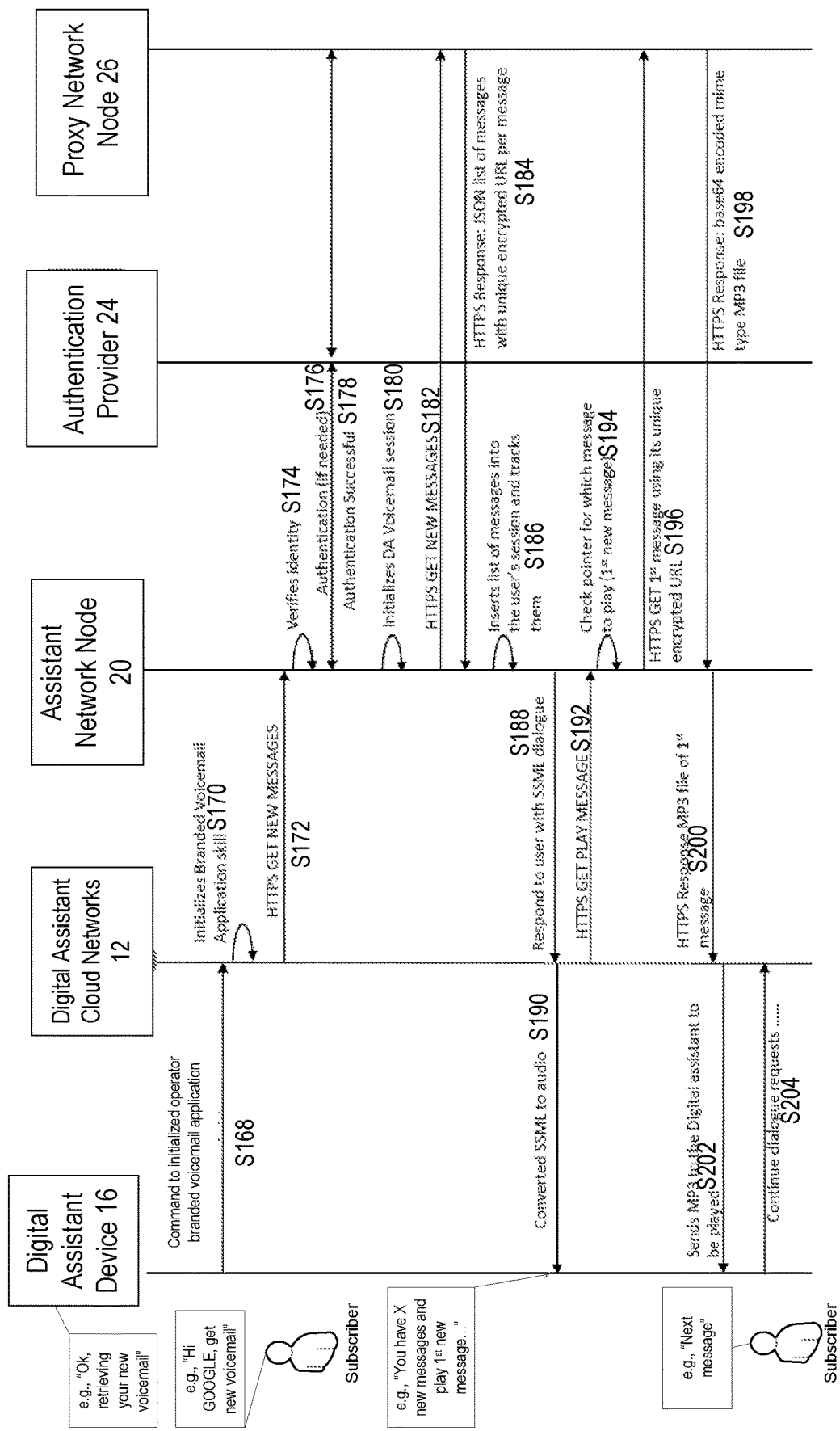
FIG. 11 is a signaling diagram of an example for accessing voicemail functions without using a voice channel according to some embodiments of the present disclosure.

FIG. 11 is a signaling diagram of an example for accessing voicemail functions without using and/or having to set up a voice channel according to some embodiments of the present disclosure. In general, one or more embodiments advantageously allow for a subscriber to use a digital assistant device 16 such as a GOOGLE HOME or AMAZON ALEXA enabled device that can access their voicemail without the need for a voice channel or call setup such that the internet-based access described herein avoids having to establish a voice channel within a cellular network (PLMN) to access voicemail in the PLMN and/or avoids having to establish a voice channel within a fixed network (PSTN) to access voicemail in a PLMN and/or avoids having to establish a voice channel in a network of any network type that involves, uses and/or relies on at least one dedicated voice channel to support voice communications). The subscriber triggers a digital assistant application operating at the digital assistant device 16 to access the operator's voicemail using a voice command. In one or more embodiments, all signaling for accessing the voicemail system 30 may be based on HTTP or HTTPS (which is the TLS secured version of HTTP) or Transport Layer Security (TLS). In other words, in one or more embodiments, HTTP/HTTPS is used to retrieve voicemails from voicemail system 30 such that no voice/phone channels in a PLMN are used for the retrieval process. The voicemail access proxy (i.e., proxy network node 26) may or may not be a function of the voicemail system 30, i.e., may or may not be implemented in voicemail system 30.

Referring to FIG. 11, a digital assistant device 16 transmits (Block S168) a command to initialize operator branded voicemail application (i.e., software application) such as in response to an audible command and/or touch command and/or motion command from the user/subscriber. The digital assistant cloud networks 12 (i.e., one or more entities in the cloud networks 12) initializes (Block S170) a branded voicemail application skill (i.e., software application). The digital assistant cloud network 14 transmits (Block S172) one or more, e.g., HTTPS GET NEW messages to the assistant network node 20 such as to requests the voicemail messages.

The assistant network node 20 verifies (Block S174) the identity associated with the GET NEW message(s). If authentication is needed and/or required, authentication is performed as described herein and if authentication successful, the process proceeds (Blocks S176-S178). The assistant network node 20 initializes (Block S180) a digital assistant device 16 (DA) voicemail session at the assistant network node 20. Assistant network node 20 transmits (Block S182) one or more HTTPS GET NEW messages to the proxy network node 26. In response to the received GET NEW message(s), the proxy network node 26 transmits (Block S184) a HTTP Response. In one or more embodiments, the HTTP Response includes a JavaScript Object Notation (JSON) list of messages with a uniquely encrypted URL per message.

After receiving the HTTPS Response message, the assistant network node 20 inserts (Block S186) a list of messages into the DA voicemail session and tracks them. The assistant network node 20 responds (Block S188) to the digital assistant device 16 with SSML dialogue associated with the list of messages. The digital assistant cloud networks 12 converts the SSML dialogue to audio data and transmits (Block S190) the audio data to the digital assistant device 16 for audio output to the subscriber. The digital assistant cloud networks 12 transmits (Block S192) an HTTPS GET PLAY message to the assistant network node 20 to, for example, initiate retrieval of one or more messages for play/audio output at the digital assistant device 16. The assistant network node 20 is configured to check (Block S194) a logical pointer associated with the DA voicemail session to determine which message to play (e.g., $1^{st}$ message).

The assistant network node 20 is configured to transmit (Block S196) a HTTPS GET message, to the proxy network node 26, using its unique encrypted URL for retrieving the message (e.g., $1^{st}$ message). The proxy network node 26 retrieves the message from the voicemail system 30, converts the message to an audio file/data (e.g., MP3 file), and transmits (Block S198) a HTTPS response message that includes the audio file such as a base64 encoded mime type MP3 file. The assistant network node 20 receives the HTTPS response from the proxy network node 26 and is configured to transmit (Block S200) the HTTPS response MP3 file of the message to the digital assistant cloud network 14. The digital assistant cloud networks 12 is configured to receive the HTTPS response from the assistant network node 20 and transmit (Block S202) the audio file to the digital assistant device 16 for audio playback. The process may continue for other messages and/or other voicemail functions (Block S204).

Various authentications methods are described below for operator voicemail access. The various authentication methods may generally correspond to one or more of: a mobile user digital assistant device 16 account phone number for voicemail access with a one time password verification, mobile user digital assistant device PIN authentication for voicemail access and a mobile user voicemail access with account linking via OAuth. One or more of these authentication methods may be combined.

In one or more embodiments, a subscriber adds the operator voicemail access application to a device associated with the subscriber such as a mobile phone. For example, the subscriber access the digital assistant device 16 application (each digital assistant device 16 has its own account services application) and searches the available services/functions available for their mobile operator or voicemail provider. The subscriber accepts the terms and conditions for using the voicemail service and enters a login information (e.g., login character(s), password, etc.) for the voicemail service. After the login information is linked, the subscriber can access and interact with their operator voicemail provider as described herein.

Figure 12:
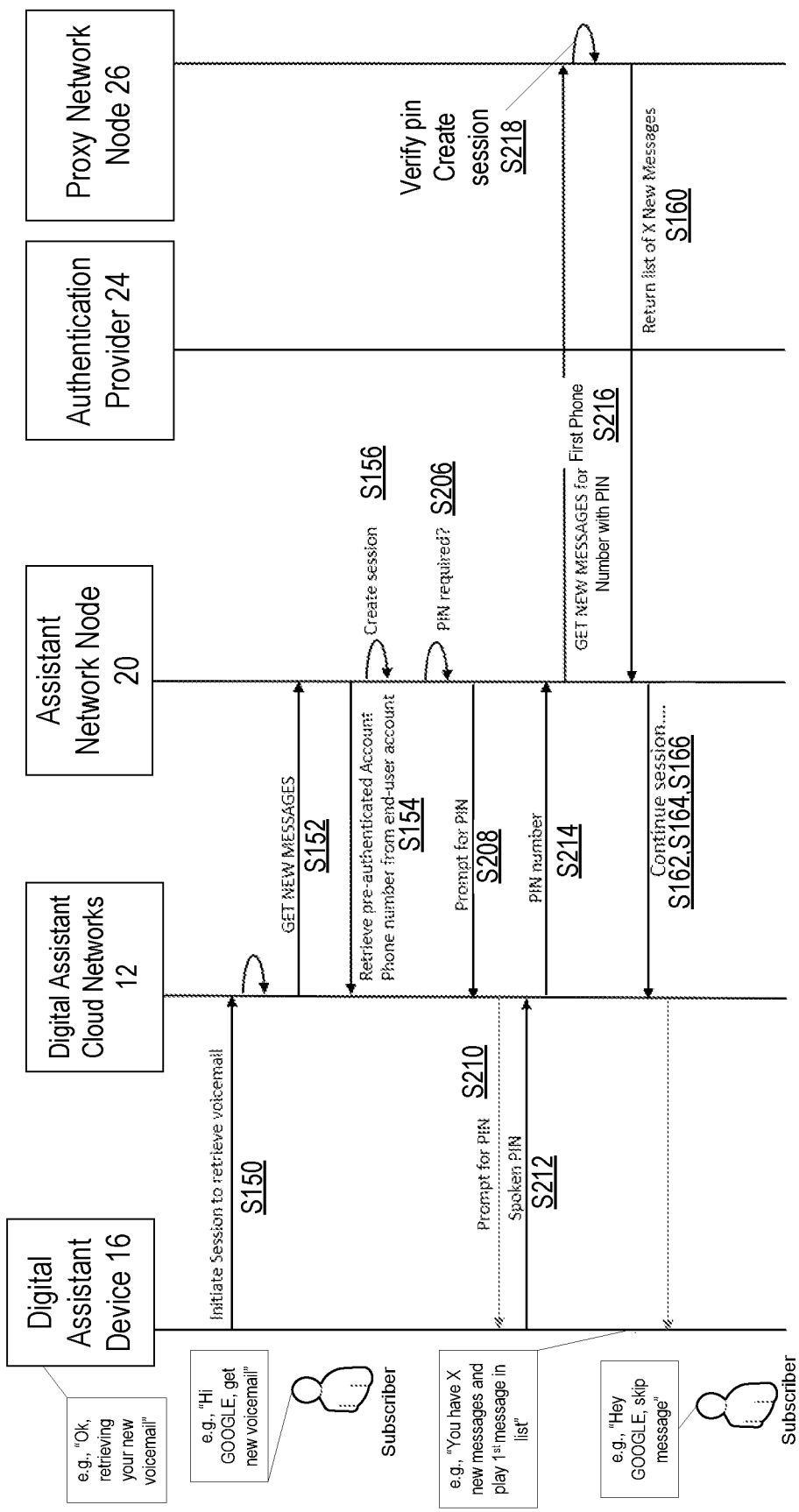
FIG. 12 is a signaling diagram of another example of an authentication process for subscriber authentication according to some embodiments of the present disclosure.

FIG. 12 is a signaling diagram of another example of an authentication process for subscriber authentication according to some embodiments of the present disclosure. Some functions denoted by already presented reference designators are described above with respect to FIG. 9. With respect to Block S206, the assistant network node 20 is configured to determine whether a PIN and/or security/identification characters are required. If the assistant network node 20 determines a PIN is required, the assistant network node 20 is configured to prompt (Block S208) the digital assistant cloud networks 12 for the PIN. The digital assistant cloud networks 12 is configured to prompt (Block S210) the digital assistant device 16 for the PIN such as to, for example, audibly ask the subscriber for the PIN.

The digital assistant device 16 is configured to receive an audible PIN from the subscriber and transmit (Block S212-S14) the PIN to the digital assistant cloud networks 12. The digital assistant cloud networks 12 is configured to transmit the PIN to the assistant network node 20. The assistant network node 20 is configured to transmit (Block S216) a GET NEW messages request/command to the proxy network node 26 where the request/command includes the first phone number and the PIN. The proxy network node 26 verifies the PIN and creates a session for the subscriber (Block S218). Blocks S160, S162, S164 and S166 are performed as described above.

Figure 13:
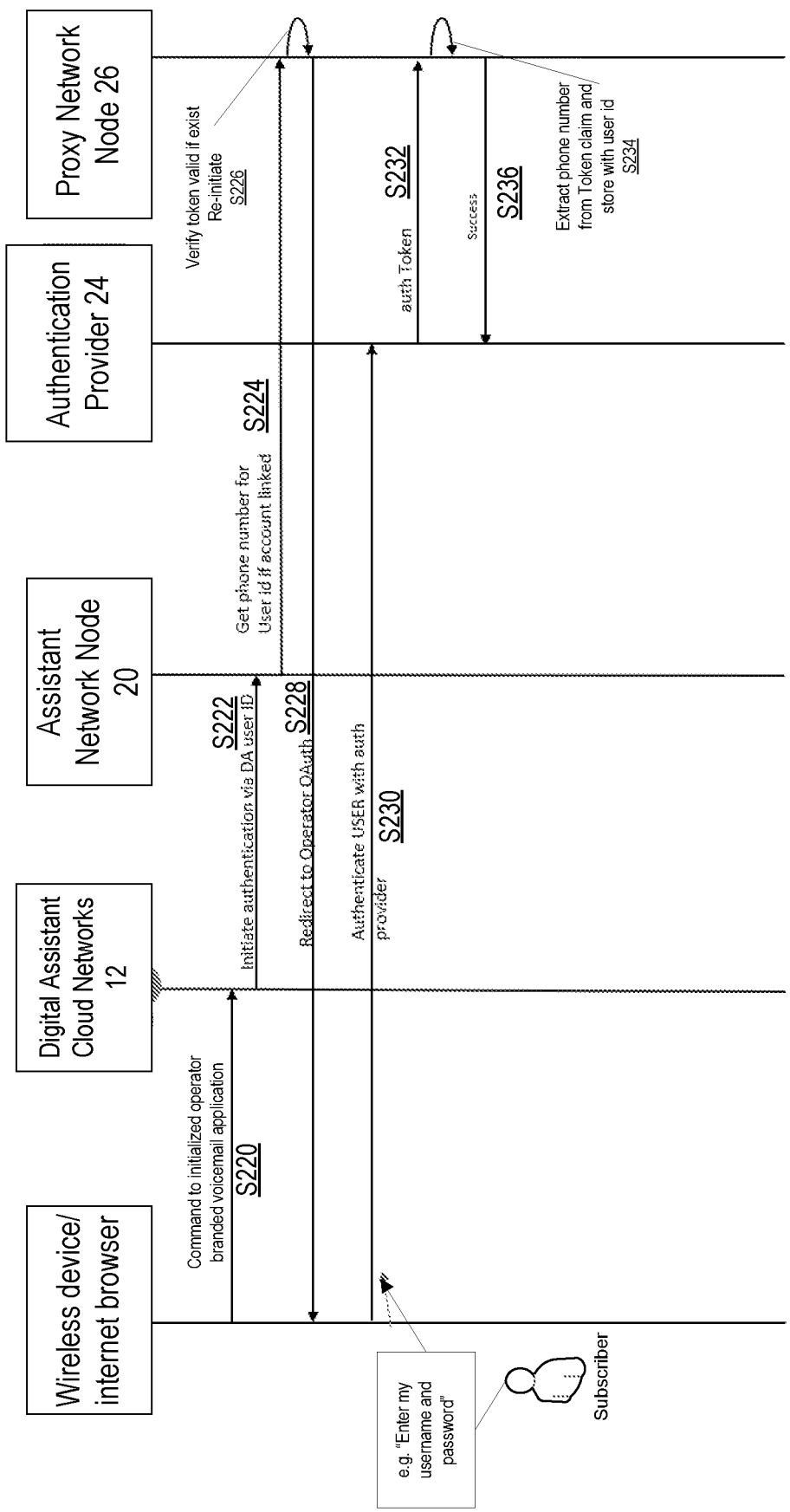
FIG. 13 is a signaling diagram of another example of an authentication process for subscriber authentication according to some embodiments of the present disclosure.

FIG. 13 is a signaling diagram of another example of an authentication process for subscriber authentication according to some embodiments of the present disclosure. Wireless device and/or an internet browser is configured to provide (Block S220) a command to initialize operator branded voicemail application associated with voicemail system 30. In one or more embodiments, the command may correspond to one or more of a voice command, touch command, etc. The digital assistant cloud networks 12 is configured to initiate (Block S222) authentication via a digital assistant identifier (e.g., user ID) associated with the subscriber and digital assistant device 16. The assistant network node 20 is configured to transmit (Block S224) a message, to the proxy network node 26, to get a phone number (i.e., get at least some subscriber information) for a user identifier (i.e., user ID) if a subscriber account is linked. The proxy network node 26 is configured to verify a token associated with the subscriber is valid if the token exists, else the process to get and verify a token is re-initiated (Block S226).

The proxy network node 26 is configured to redirect (Block S228) to operator authentication such as to cause the subscriber to authenticate with authentication provider 24. The authentication provider 24 receives (Block S230) authentication data (e.g., username, password, etc.) from the wireless device/internet browser. The authentication provider 24 receives the authentication data and issues an authentication token to the proxy network node 26 based at least in part on the received authentication data (Block S232). The proxy network node 26 is configured to extract the subscriber information such as a phone number from the token claim and store the phone number with the user ID (Block S234). The proxy network node 26 is configured to indicate (Block S236) the authentication was successful to the authentication provider 24.

Figure 14:
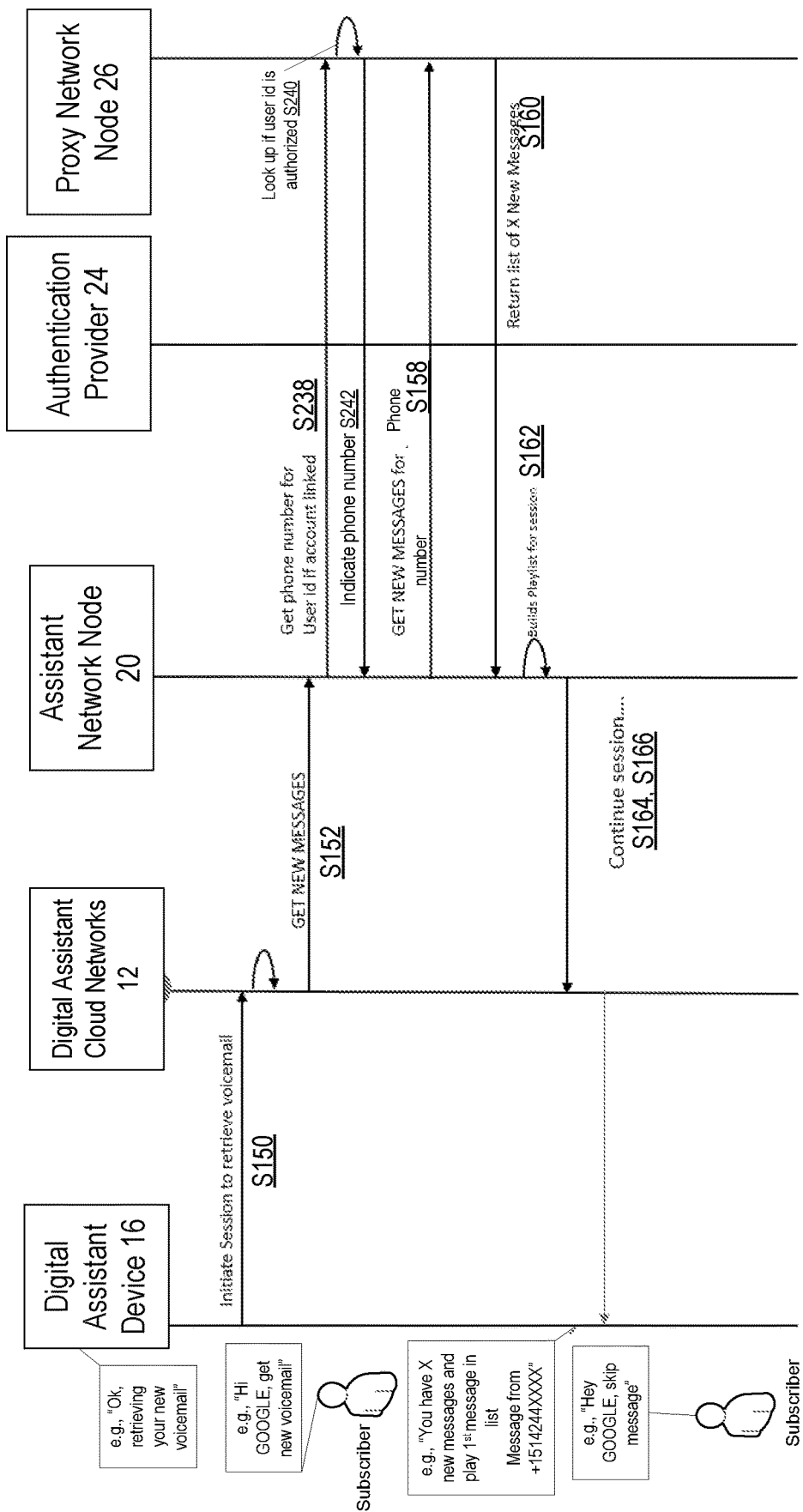
FIG. 14 is a signaling diagram of another example of an authentication process for subscriber authentication according to some embodiments of the present disclosure.

FIG. 14 is a signaling diagram of another example of an authentication process for subscriber authentication according to some embodiments of the present disclosure. Blocks S150 and S152 as described above. The assistant network node 20 is configured to transmit (Block S238) a message to the proxy network node 26 to get a phone number (i.e., subscriber information) for a user ID if the subscriber account is linked. The proxy network node 26 is configured to look up and/or determine (Block S240) if the user ID is authorized. The proxy network node 26 is configured to indicate (Block S242) the phone number to the assistant network node 20. Blocks S160, S162, S164 and S166 are described above.

Figure 15:
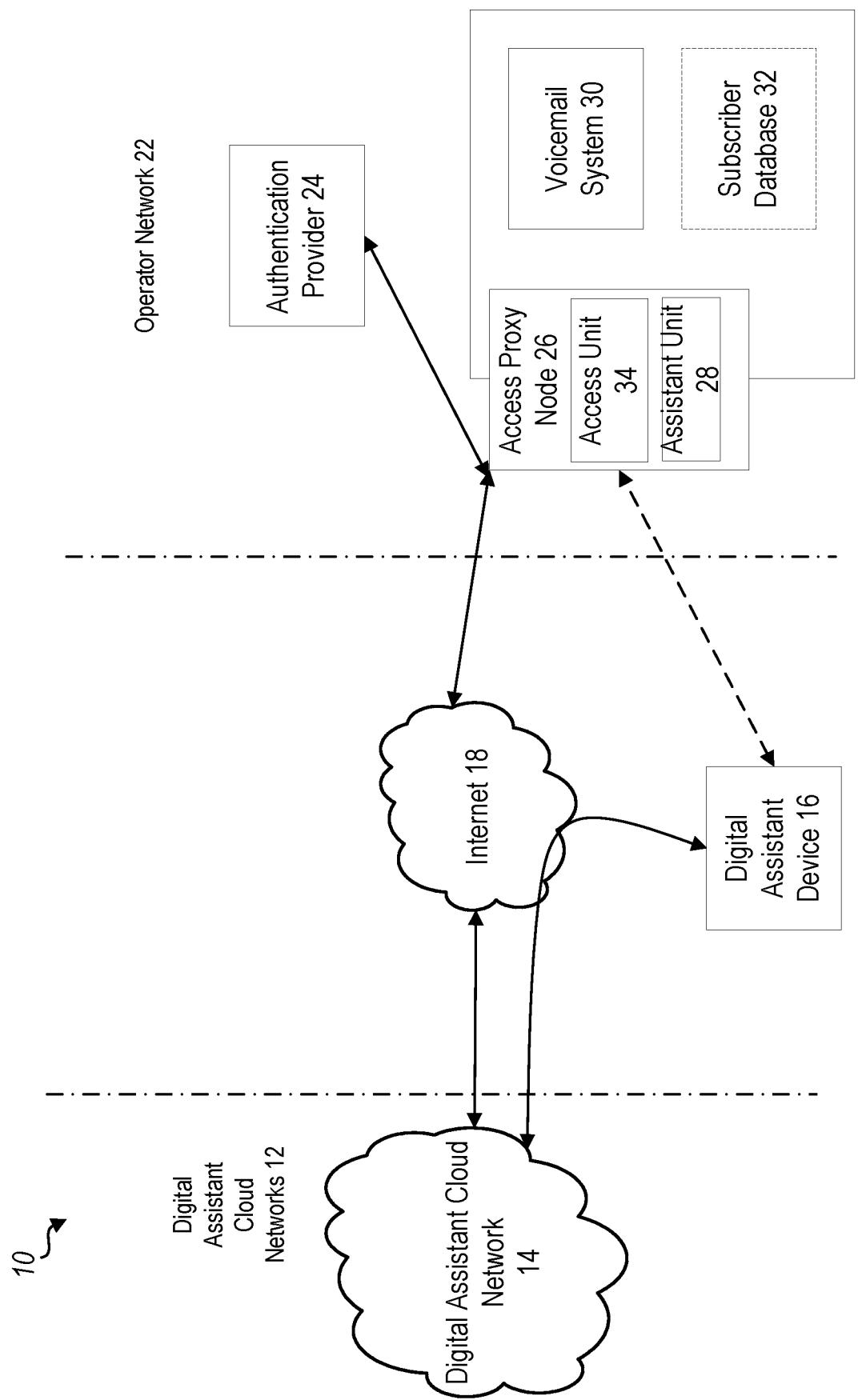
FIG. 15 is a block diagram of is a schematic diagram of another exemplary network architecture illustrating a communication system according to the principles in the present disclosure.

FIG. 15 is a block diagram of another exemplary network architecture illustrating a communication system according to the principles in the present disclosure. In particular, at least some functionality of the assistant network node 20 has been added to proxy network node 26 such that proxy network node 26 is the proxy between the digital assistant cloud networks 12 and operator network 22 for allowing access to voicemail system 30 for performing one or more voicemail functions.

FIG. 16 is a diagram of an example visual display for digital assistant device 16 in addition to the voice user interface where the displayed data may be associated with voicemail data in one or more messages described herein.

In one or more embodiments, any subsequent authentication (PIN or otherwise) may be required after initial setup and dialing-in to the voicemail system 30 over regular voice channels or stream voice calls is no longer needed, thereby providing a seamless and efficient access method to access an operator's voicemail system 30 where the voicemail system 30 is installed in a cloud or in the operator's network.

Some Examples

Example A1. An assistant network node 20 configured to communicate with a proxy network node 26, the assistant network node 20 being configured to, and/or comprising a communication interface 38 and/or comprising processing circuitry 40 configured to:

receive, over an internet, a request message associated with a digital assistant device 16, the request message inquiring about a voicemail function of a voicemail system 30 related to a user of a fixed or cellular network;

access the voicemail system 30 in the fixed or cellular network based at least in part on the request message, the accessing of the voicemail system 30 being performed without establishing a voice channel in the fixed or cellular network; and return a response message to the digital assistant device 16 over the internet based at least in part on the access of the voicemail system 30 in the fixed or cellular network.

Example A2. The assistant network node 20 of Example A1, wherein the accessing of the voicemail system 30 in the fixed or cellular network includes:
transmitting a first retrieval message to the proxy network node 26, the first request message configured to cause the proxy network node 26 to access a voicemail system 30 to retrieve:
information associated with the digital assistant device 16 and a voicemail function of the voicemail system 30 in the fixed or cellular network; and
at least one voicemail message associated with the information;
receiving a first reply message from the proxy network node 26 including:
information associated with the voicemail function of the voicemail system 30 in the fixed or cellular network; and
the at least one voicemail message; and
the response message to the digital assistant device 16 including the at least one voicemail message.

Example A3. The assistant network node 20 of Example A1, wherein the accessing of the voicemail system 30 in the fixed or cellular network includes:
transmitting a first retrieval message to the proxy network node 26, the first retrieval message configured to cause the proxy network node 26 to access the voicemail system 30 to retrieve information associated with the digital assistant device 16 and a voicemail function of the voicemail system 30 in the fixed or cellular network;
receiving a first reply message from the proxy network node 26 indicating the information associated with the voicemail function of the voicemail system 30 in the fixed or cellular network;
transmitting a second retrieval message associated with the digital assistant device 16 to the proxy network node 26, the second retrieval message being based at least in part on the information associated with the voicemail function of the voicemail system 30 in the fixed or cellular network and configured to cause retrieval of the at least one voicemail message; and
receiving the at least one voicemail message from the proxy network node 26 based at least in part on the second retrieval message; and
the response message including the at least voicemail message destined for the digital assistant device 16.

Example A4. The assistant network node 20 of any one of Examples A1-A3, wherein the messages are HTTP/S messages.

Example A5. The assistant network node 20 of any one of Examples A1-A4, wherein the assistant network node 20 and/or the communication interface 38 and/or the processing circuitry 40 is further configured to one or more of retrieve a pre-authentication indication for the digital assistant device 16 and obtain authentication information to authenticate digital assistant 16.

Example A6. The assistant network node 20 of any one of Examples A1-A5, wherein the digital assistant device 16 is a voice activated digital assistant device 16.

Example B1. A method implemented in an assistant network node 20 that is configured to communicate with a proxy network node 26, the method comprising:

receiving, over an internet, a request message associated with a digital assistant device 16, the request message inquiring about a voicemail function of a voicemail system 30 related to a user of a fixed or cellular network;
accessing the voicemail system 30 in the fixed or cellular network based at least in part on the request message, the accessing of the voicemail system 30 being performed without establishing a voice channel in the fixed or cellular network; and
returning a response message to the digital assistant device 16 over the internet based at least in part on the access of the voicemail system 30 in the fixed or cellular network.

Example B2. The method of Example B 1, wherein the accessing of the voicemail system 30 in the fixed or cellular network includes:
transmitting a first retrieval message to the proxy network node 26, the first request message configured to cause the proxy network node 26 to access a voicemail system 30 to retrieve:
information associated with the digital assistant device 16 and a voicemail function of the voicemail system 30 in the fixed or cellular network; and
at least one voicemail message associated with the information;
receiving a first reply message from the proxy network node 26 including:
information associated with the voicemail function of the voicemail system 30 in the fixed or cellular network; and
the at least one voicemail message; and
the response message to the digital assistant device 16 including the at least one voicemail message.

Example B3. The method of Example B 1, wherein the accessing of the voicemail system 30 in the fixed or cellular network includes:
transmitting a first retrieval message to the proxy network node 26, the first retrieval message configured to cause the proxy network node 26 to access the voicemail system 30 to retrieve information associated with the digital assistant device 16 and a voicemail function of the voicemail system 30 in the fixed or cellular network;
receiving a first reply message from the proxy network node 26 indicating the information associated with the voicemail function of the voicemail system 30 in the fixed or cellular network;
transmitting a second retrieval message associated with the digital assistant device 16 to the proxy network node 26, the second retrieval message being based at least in part on the information associated with the voicemail function of the voicemail system 30 in the fixed or cellular network and configured to cause retrieval of the at least one voicemail message; and
receiving the at least one voicemail message from the proxy network node 26 based at least in part on the second retrieval message; and
the response message including the at least voicemail message destined for the digital assistant device 16.

Example B4. The method of any one of Examples B1-B3, wherein the messages are HTTP/S messages.

Example B5. The method of any one of Examples B1-B4, further comprising one or more of retrieving a pre-authentication indication for the digital assistant device 16 and obtaining authentication information to authenticate digital assistant device 16.

Example B6. The assistant network node 20 of any one of Examples B1-B5, wherein the digital assistant device 16 is a voice activated digital assistant device 16.

Example C1. A proxy network node 26 configured to communicate with a voicemail system 30 and an assistant network node 20, the proxy network node 26 configured to, and/or comprising a communication interface 50 and/or comprising processing circuitry 52 configured to:
  access a voicemail system 30 in a fixed or cellular network related to a user based at least in part on an inquiry about a voicemail function of the voicemail system 30 from a digital assistant device 16, the accessing of the voicemail system 30 being performed without establishing a voice channel in the fixed or cellular network; and
  return a message destined for the digital assistant device 16 based at least in part on the access of the voicemail system 30 in the fixed or cellular network, the message being associated with the inquiry about the voicemail function of the voicemail system 30.

Example C2. The proxy network node 26 of Example C1, wherein the proxy network node 26 is further configured to, and/or the communication interface 50 and/or the processing circuitry 52 is further configured to:
  receive a first retrieval message, the first retrieval message configured to cause the proxy network node 26 to access a voicemail system 30 to retrieve:
    information associated with the digital assistant device 16 and a voicemail function of the voicemail system 30 in the fixed or cellular network; and
    at least one voicemail message associated with the information;
  transmit a first reply message including:
    information associated with the voicemail function of the voicemail system 30 in the fixed or cellular network; and
    the at least one voicemail message; and
  the message destined to the digital assistant device 16 including the at least one voicemail message.

Example C3. The proxy network node 26 of Example C1, wherein the proxy network node 26 is further configured to, and/or the communication interface 50 and/or the processing circuitry 52 is further configured to:
  receive a first retrieval message, the first retrieval message configured to cause the proxy network node 26 to access the voicemail system 30 to retrieve information associated with the digital assistant device 16 and a voicemail function of the voicemail system 30 in the fixed or cellular network;
  transmit a first reply message from the proxy network node 26 indicating the information associated with the voicemail function of the voicemail system 30 in the fixed or cellular network;
  receive a second retrieval message associated with the digital assistant device 16 to the proxy network node 26, the second retrieval message being based at least in part on the information associated with the voicemail function of the voicemail system 30 in the fixed or cellular network and configured to cause retrieval of the at least one voicemail message; and
  transmit the at least one voicemail message based at least in part on the second retrieval message; and
  the message destined for the digital assistant device 16 including the at least one voicemail message.

Example C4. The proxy network node 26 of any one of Examples C1-C3, wherein the messages are HTTP/S messages.

Example C5. The proxy network node 26 of any one of Examples C1-C4, wherein the accessing of the voicemail system 30 bypasses a telephony user interface of the voicemail system 30.

Example C6. The proxy network node 26 of any one of Examples C1-05, wherein the proxy network node 26 is a trusted entity that is configured to perform voicemail box administration with the voicemail system 30 for a subscriber associated with the digital assistant device 16.

Example C7. The proxy network node 26 of any one of Examples C2-C6, wherein the information associated with the voicemail function is a list of URLs, each URL being associated with a respective voicemail message; and
  the at least one voicemail message destined for the digital assistant device 16 being an encoded audio file.

Example C8. The proxy network node 26 of any one of Examples C1-C7, wherein the message destined for digital assistant device 16 is based on retrieved audio data associated from the voicemail system 30 that has been converted to audio data compatible with the digital assistant device 16.

Example C9. The proxy network node 26 of any one of Examples C1-C8, wherein the digital assistant device 16 is a voice activated digital assistant device 16.

Example D1. A method implemented in a proxy network node 26 that is configured to communicate with a voicemail system 30 and an assistant network node 20, the method comprising:
  accessing a voicemail system 30 in a fixed or cellular network related to a user based at least in part on an inquiry about a voicemail function of the voicemail system 30 from a digital assistant device 16, the accessing of the voicemail system 30 being performed without establishing a voice channel in the fixed or cellular network; and
  returning a message destined for the digital assistant device 16 based at least in part on the access of the voicemail system 30 in the fixed or cellular network, the message being associated with the inquiry about the voicemail function of the voicemail system 30.

Example D2. The method of Example D1, further comprising:
  receiving a first retrieval message, the first retrieval message configured to cause the proxy network node 26 to access a voicemail system 30 to retrieve:
    information associated with the digital assistant device 16 and a voicemail function of the voicemail system 30 in the fixed or cellular network; and
    at least one voicemail message associated with the information;
  transmitting a first reply message including:
    information associated with the voicemail function of the voicemail system 30 in the fixed or cellular network; and
    the at least one voicemail message; and
  the message destined to the digital assistant device 16 including the at least one voicemail message.

Example D3. The method of Example D1, further comprising:
  receiving a first retrieval message, the first retrieval message configured to cause the proxy network node 26 to access the voicemail system 30 to retrieve information associated with the digital assistant device 16 and a voicemail function of the voicemail system 30 in the fixed or cellular network;

transmitting a first reply message from the proxy network node 26 indicating the information associated with the voicemail function of the voicemail system 30 in the fixed or cellular network;

receiving a second retrieval message associated with the digital assistant device 16 to the proxy network node 26, the second retrieval message being based at least in part on the information associated with the voicemail function of the voicemail system 30 in the fixed or cellular network and configured to cause retrieval of the at least one voicemail message; and transmitting the at least one voicemail message based at least in part on the second retrieval message; and the message destined for the digital assistant device 16 including the at least voicemail message.

Example D4. The method of any one of Examples D1-D3, wherein the messages are HTTP/S messages.

Example D5. The method of any one of Examples D1-D4, wherein the accessing of the voicemail system 30 bypasses a telephony user interface of the voicemail system 30.

Example D6. The method of any one of Examples D1-D5, wherein the proxy network node 26 is a trusted entity that is configured to perform voicemail box administration with the voicemail system 30 for a subscriber associated with the digital assistant device 16.

Example D7. The method of any one of Examples D2-D7, wherein the information associated with the voicemail function is a list of URLs, each URL being associated with a respective voicemail message; and the at least one voicemail message destined for the digital assistant device 16 being an encoded audio file.

Example D8. The method of any one of Examples D1-D7, wherein the message destined for digital assistant device 16 is based on retrieved audio data associated from the voicemail system 30 that has been converted to audio data compatible with the digital assistant device 16.

Example D9. The method of any one of Examples D1-D8, wherein the digital assistant device 16 is a voice activated digital assistant device 16.

Example E1. A node 20, 26 configured to, and/or comprising a communication interface 38, 50 and/or comprising processing circuitry 40, 52 configured to:

receive, over an internet and from a digital assistant device 16, a request message inquiring about a voicemail function of a voicemail system 30 related to a user of a fixed or cellular network;

access the voicemail system 30 in the fixed or cellular network based at least in part on the request message, the accessing of the voicemail system 30 being performed without establishing a voice channel in the fixed or cellular network; and return a response message to the digital assistant device 16 over the internet based at least in part on the access of the voicemail system 30 in the fixed or cellular network.

Example E2. The node 20, 26 of Example E1, wherein the messages are HTTP/S messages.

Example E3. The node 20, 26 of any one of Examples E1-E2, wherein the accessing of the voicemail system 30 bypasses a telephony user interface of the voicemail system 30.

Example E4. The node 20, 26 of any one of Examples E1-E3, wherein the node and/or the communication interface 38, 50 and/or the processing circuitry 40, 52 is further configured to one or more of retrieve a pre-authentication indication for the digital assistant device 16 and obtain authentication information to authenticate digital assistant device 16.

Example E5. The node 20, 26 of any one of Examples E1-E4, wherein the digital assistant device 16 is a voice activated digital assistant device 16.

Example E6. The node 20, 26 of Example E1, wherein the node 20, 26 and/or the communication interface 38, 50 and/or the processing circuitry 40, 52 is further configured to one or more of retrieve a pre-authentication indication for the digital assistant device 16 and get authentication information to authenticate digital assistant device 16.

Example E7. The node 20, 26 of Example E1, wherein the accessing of the voicemail system 30 bypasses a telephony user interface of the voicemail system 30.

Example E8. The node 20, 26 of Example E1, wherein the node 20, 26 is a trusted entity that is configured to perform voicemail box administration with the voicemail system 30 for a subscriber associated with the digital assistant device 16.

Example E9. The node 20, 26 of Example E1, wherein the information associated with the voicemail function is a list of URLs, each URL being associated with a respective voicemail message; and the at least one voicemail message destined for the digital assistant device 16 being an encoded audio file.

Example E10. The node 20, 26 of Example E1, wherein the message destined for digital assistant device 16 is based on retrieved audio data associated from the voicemail system 30 that has been converted to audio data compatible with the digital assistant device 16.

Example F1. A method implemented by a node 20, 26, the method comprising:

receiving, over an internet and from a digital assistant device 16, a request message inquiring about a voicemail function of a voicemail system 30 related to a user of a fixed or cellular network;

accessing the voicemail system 30 in the fixed or cellular network based at least in part on the request message, the accessing of the voicemail system 30 being performed without establishing a voice channel in the fixed or cellular network; and returning a response message to the digital assistant device 16 over the internet based at least in part on the access of the voicemail system 30 in the fixed or cellular network.

Example F2. The method of Example F1, wherein the messages are HTTP/S messages.

Example F3. The method of any one of Examples F1-F2, wherein the accessing of the voicemail system 30 bypasses a telephony user interface of the voicemail system 30.

Example F4. The method of any one of Examples F1-F3, further comprising one or more of retrieve a pre-authentication indication for the digital assistant device 16 and obtain authentication information to authenticate digital assistant device 16.

Example F5. The method of any one of Examples F1-F4, wherein the digital assistant device 16 is a voice activated digital assistant device 16.

Example F6. The method of Example F1, further comprising one or more of retrieve a pre-authentication indication for the digital assistant device 16 and get authentication information to authenticate digital assistant device 16.

Example F7. The method of Example F1, wherein the accessing of the voicemail system 30 bypasses a telephony user interface of the voicemail system 30.

Example F8. The method of Example F1, wherein the node 20, 26 is a trusted entity that is configured to perform voicemail box administration with the voicemail system 30 for a subscriber associated with the digital assistant device 16.

Example F9. The method of Example F1, wherein the information associated with the voicemail function is a list of URLs, each URL being associated with a respective voicemail message; and the at least one voicemail message destined for the digital assistant device 16 being an encoded audio file.

Example F10. The method of Example F1, wherein the message destined for digital assistant device 16 is based on retrieved audio data associated from the voicemail system 30 that has been converted to audio data compatible with the digital assistant device 16.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An assistant network node configured to communicate with a voicemail system via a proxy network node, the assistant network node comprising:
processing circuitry configured to:
receive, over an internet, a request message associated with a digital assistant device, the request message inquiring about a voicemail function of the voicemail system related to a user of a fixed or cellular network;
access the voicemail system in the fixed or cellular network based at least in part on the request message, the accessing of the voicemail system being performed without establishing a voice channel in the fixed or cellular network; and
return a response message to the digital assistant device over the internet based at least in part on the access of the voicemail system in the fixed or cellular network, the response message being associated with the request message inquiring about the voicemail function of the voicemail system.

2. The assistant network node of claim 1, wherein the accessing of the voicemail system in the fixed or cellular network includes:
- transmitting a first retrieval message to the proxy network node, the first retrieval message configured to cause the proxy network node to access a voicemail system to retrieve:
  - information associated with the digital assistant device and a voicemail function of the voicemail system in the fixed or cellular network; and
  - at least one voicemail message associated with the information;
- receiving a first reply message from the proxy network node including:
  - information associated with the voicemail function of the voicemail system in the fixed or cellular network; and
  - the at least one voicemail message; and
- the response message to the digital assistant device including the at least one voicemail message.

3. The assistant network node of claim 1, wherein the accessing of the voicemail system in the fixed or cellular network includes:
- transmitting a first retrieval message to the proxy network node, the first retrieval message configured to cause the proxy network node to access the voicemail system to retrieve information associated with the digital assistant device and a voicemail function of the voicemail system in the fixed or cellular network;
- receiving a first reply message from the proxy network node indicating the information associated with the voicemail function of the voicemail system in the fixed or cellular network;
- transmitting a second retrieval message associated with the digital assistant device to the proxy network node, the second retrieval message being based at least in part on the information associated with the voicemail function of the voicemail system in the fixed or cellular network and configured to cause retrieval of at least one voicemail message; and
- receiving the at least one voicemail message from the proxy network node based at least in part on the second retrieval message; and
- the response message including at least voicemail message destined for the digital assistant device.

4. The assistant network node of claim 1, wherein the messages are HTTP/S messages.

5. The assistant network node of claim 1, wherein the processing circuitry is further configured to one or more of retrieve a pre-authentication indication for the digital assistant device and obtain authentication information to authenticate the digital assistant device.

6. The assistant network node of claim 1, wherein the digital assistant device is a voice activated digital assistant device.

7. A proxy network node configured to communicate with at least a voicemail system, the proxy network node comprising:
- processing circuitry configured to:
  - access a voicemail system in a fixed or cellular network related to a user based at least in part on an inquiry about a voicemail function of the voicemail system from a digital assistant device, the accessing of the voicemail system being performed without establishing a voice channel in the fixed or cellular network; and
  - return a message destined for the digital assistant device based at least in part on the access of the voicemail system in the fixed or cellular network, the message being associated with the inquiry about the voicemail function of the voicemail system.

8. The proxy network node of claim 7, wherein the processing circuitry is further configured to:
- receive a first retrieval message, the first retrieval message configured to cause the proxy network node to access a voicemail system to retrieve:
  - information associated with the digital assistant device and a voicemail function of the voicemail system in the fixed or cellular network; and
  - at least one voicemail message associated with the information;
- transmit a first reply message including:
  - information associated with the voicemail function of the voicemail system in the fixed or cellular network; and
  - the at least one voicemail message; and
- the message destined to the digital assistant device including the at least one voicemail message.

9. The proxy network node of claim 7, wherein the processing circuitry is further configured to:
- receive a first retrieval message, the first retrieval message configured to cause the proxy network node to access the voicemail system to retrieve information associated with the digital assistant device and a voicemail function of the voicemail system in the fixed or cellular network;
- transmit a first reply message from the proxy network node indicating the information associated with the voicemail function of the voicemail system in the fixed or cellular network;
- receive a second retrieval message associated with the digital assistant device from the proxy network node, the second retrieval message being based at least in part on the information associated with the voicemail function of the voicemail system in the fixed or cellular network and configured to cause retrieval of at least one voicemail message; and
- transmit the at least one voicemail message based at least in part on the second retrieval message; and
- the message destined for the digital assistant device including the at least voicemail message.

10. The proxy network node of claim 8, wherein the information associated with the voicemail function is a list of URLs, each URL being associated with a respective voicemail message; and
the at least one voicemail message destined for the digital assistant device being an encoded audio file.

11. The proxy network node of claim 7, wherein the messages are HTTP/S messages.

12. The proxy network node of claim 7, wherein the accessing of the voicemail system bypasses a telephony user interface of the voicemail system.

13. The proxy network node of claim 7, wherein the proxy network node is a trusted entity that is configured to perform voicemail box administration with the voicemail system for a subscriber associated with the digital assistant device.

14. The proxy network node of claim 7, wherein the message destined for digital assistant device is based on retrieved audio data associated from the voicemail system that has been converted to audio data compatible with the digital assistant device.

15. The proxy network node of claim 7, wherein the digital assistant device is a voice activated digital assistant device.

16. A node, comprising:
processing circuitry configured to:
- receive a request message for at least one voicemail message in a voicemail system in a fixed or cellular network;
- access the voicemail system to retrieve the at least one voicemail message, the accessing of the voicemail system being performed without establishing a voice channel in the fixed or cellular network; and
- return a response message to the at least one voicemail message, the response message being associated with the request message for the at least one voicemail message in the voicemail system.

17. The node of claim 16, wherein the request message is received, over the internet from a digital assistant device; and
the at least one voicemail message is returned to the digital assistant device over the internet.

18. The node of claim 16, wherein the processing circuitry is further configured to one or more of retrieve a pre-authentication indication for a digital assistant device and obtain authentication information to authenticate the digital assistant device.

19. The node of claim 16, wherein the node is a trusted entity that is configured to perform voicemail box administration with the voicemail system for a subscriber associated with a digital assistant device.

20. The node of claim 16, wherein the processing circuitry is further configured to:
- access the voicemail system for information associated with a list of URLs, each URL being associated with a respective voicemail message or the at least one voicemail message;
- communicate the information associated with a list of URLs to a digital assistant device, the request message indicating at least one of the URLs from the list of URLs for retrieval from the voicemail system.

\* \* \* \* \*